United States Patent
Esaka et al.

(10) Patent No.: US 12,307,116 B2
(45) Date of Patent: **\*May 20, 2025**

(54) MEMORY SYSTEM

(71) Applicant: Kioxia Corporation, Tokyo (JP)

(72) Inventors: Naoki Esaka, Kanagawa (JP); Shinichi Kanno, Tokyo (JP)

(73) Assignee: Kioxia Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/516,632

(22) Filed: Nov. 21, 2023

(65) Prior Publication Data

US 2024/0086099 A1     Mar. 14, 2024

Related U.S. Application Data

(63) Continuation of application No. 17/468,163, filed on Sep. 7, 2021, now Pat. No. 11,861,202.

(30) Foreign Application Priority Data

Mar. 17, 2021    (JP) .................................. 2021-043709

(51) Int. Cl.
     *G06F 3/06*          (2006.01)

(52) U.S. Cl.
     CPC .......... *G06F 3/0644* (2013.01); *G06F 3/0604* (2013.01); *G06F 3/0659* (2013.01); *G06F 3/0679* (2013.01)

(58) Field of Classification Search
     CPC .... G06F 3/0644; G06F 3/0604; G06F 3/0659; G06F 3/0679
See application file for complete search history.

(56) References Cited

U.S. PATENT DOCUMENTS 8,516,172 B1 *   8/2013   Karamcheti .......... G06F 3/0659
                                                         710/62
8,942,248 B1 *   1/2015   Cheung ................... G06F 5/065
                                                         370/412

(Continued)

FOREIGN PATENT DOCUMENTS

| CN | 109240938 A | 1/2019 |
|---|---|---|
| CN | 110554972 A | 12/2019 |

(Continued)

OTHER PUBLICATIONS

U.S. Non-Final Office Action on U.S. Appl. No. 17/468,163 dated Apr. 27, 2023 (27 pages).

(Continued)

*Primary Examiner* — Ryan Bertram

(74) *Attorney, Agent, or Firm* — Foley & Lardner LLP

(57) ABSTRACT

According to one embodiment, a memory system includes a nonvolatile memory and a controller. The controller receives a first write request associated with first data from a host. In response to a lapse of first time since the reception of the first write request, the controller starts a write process of second data to the nonvolatile memory. The second data includes at least the first data. The controller transmits a first response to the first write request to the host in response to completion of the write process. The first time is time obtained by subtracting second time from third time designated by the host as a time limit of the transmission of the first response since the reception of the first write request.

20 Claims, 14 Drawing Sheets

(56) References Cited

U.S. PATENT DOCUMENTS

| | | | |
|---|---|---|---|
| 10,282,288 B2 | 5/2019 | Kanno | |
| 10,649,898 B2 | 5/2020 | Kim et al. | |
| 2007/0079044 A1* | 4/2007 | Mandal | G06F 13/404 710/310 |
| 2014/0019670 A1* | 1/2014 | Huang | G06F 12/0246 711/E12.008 |
| 2016/0027518 A1 | 1/2016 | Zettsu | |
| 2018/0247948 A1 | 8/2018 | Kanno | |
| 2019/0018788 A1 | 1/2019 | Yoshida et al. | |
| 2019/0179567 A1 | 6/2019 | Kanno et al. | |
| 2019/0369888 A1 | 12/2019 | Hsiao et al. | |
| 2020/0089407 A1 | 3/2020 | Baca et al. | |
| 2020/0110555 A1* | 4/2020 | Hsiao | G06F 3/0679 |
| 2021/0064290 A1 | 3/2021 | Kanno | |
| 2021/0223962 A1 | 7/2021 | Esaka et al. | |

FOREIGN PATENT DOCUMENTS

| | | |
|---|---|---|
| JP | 2006-350881 A | 12/2006 |
| JP | 2016-024678 A | 2/2016 |
| JP | 6414853 B2 | 10/2018 |
| JP | 2019-105873 A | 6/2019 |
| JP | 2020-198128 A | 12/2020 |
| JP | 2021-033847 A | 3/2021 |
| JP | 2021-114039 A | 8/2021 |

OTHER PUBLICATIONS

U.S. Notice of Allowance on U.S. Appl. No. 17/468,163 dated Aug. 17, 2023 (9 pages).

* cited by examiner

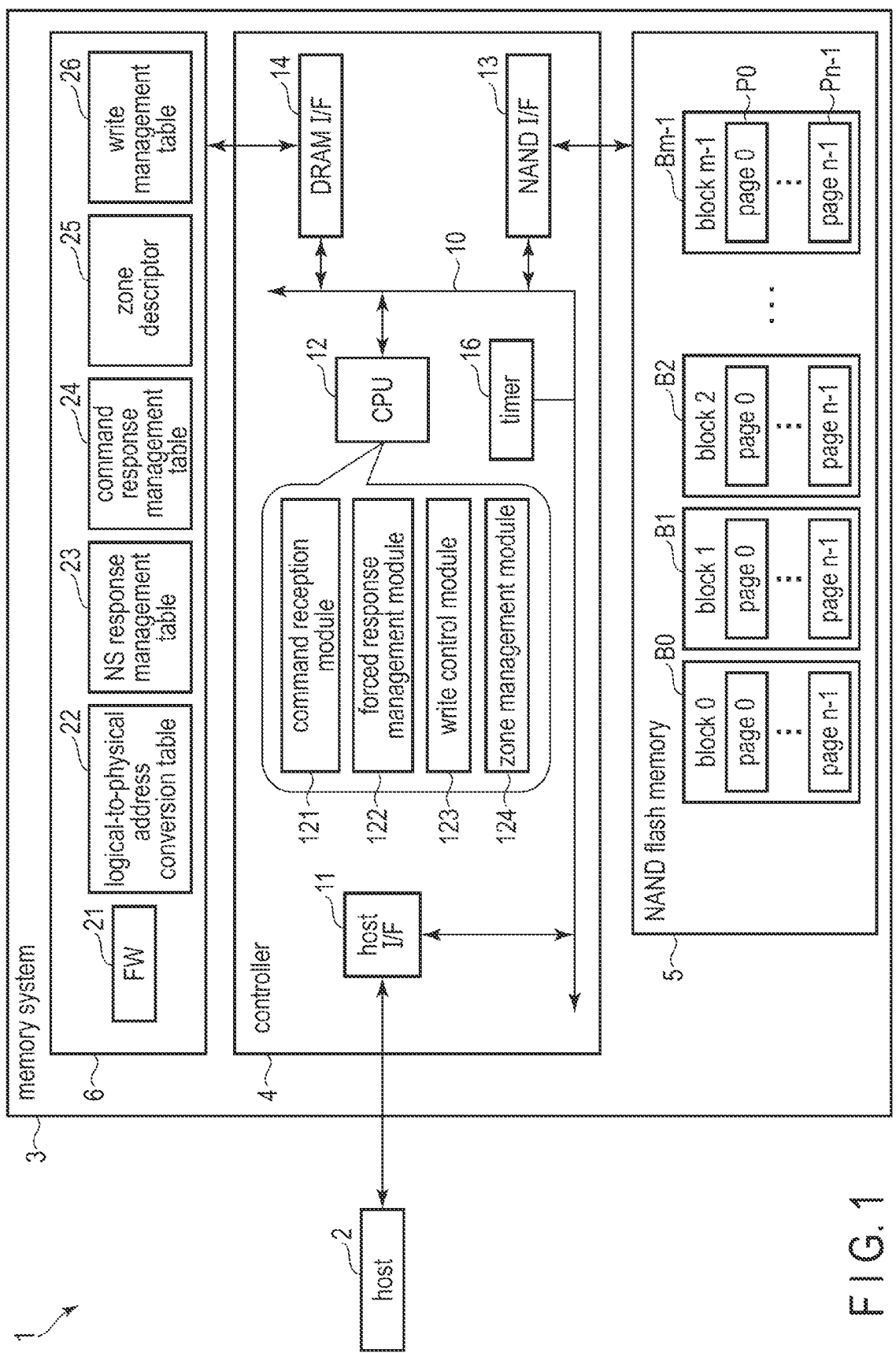
F I G. 1

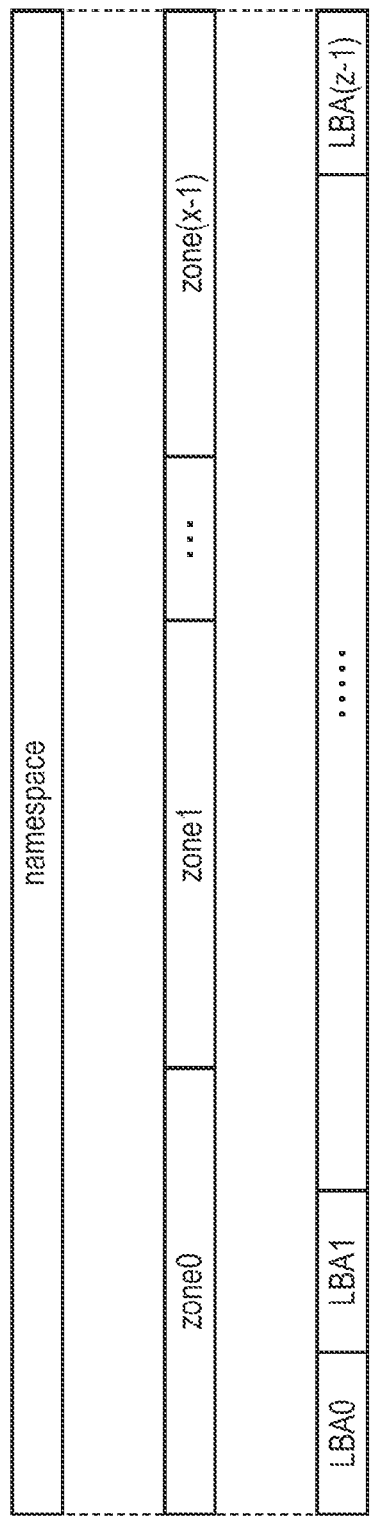
F I G. 2

| Feature | value |
|---|---|
| forced_completion_time (optional, set by user) | 0: not triggered, m>1: response is completed within m*100ms |
| process_time (optional) | n: start processing when (m-n)*100ms has elapsed |

| LBA | physical address |
|---|---|
| 0 | X |
| 1 | Y |
| 2 | Z |
| ⋮ | ⋮ |

| namespace ID | forced response completion time | forced response trigger time |
|---|---|---|
| 1 | 20000 | 15000 |

| command ID | time until triggering |
|---|---|
| 11 | 1200 |
| 12 | 10000 |

F I G. 7

| command ID | LBA | data length | data buffer information | zone |
|---|---|---|---|---|
|  |  |  |  |  |

F I G. 8

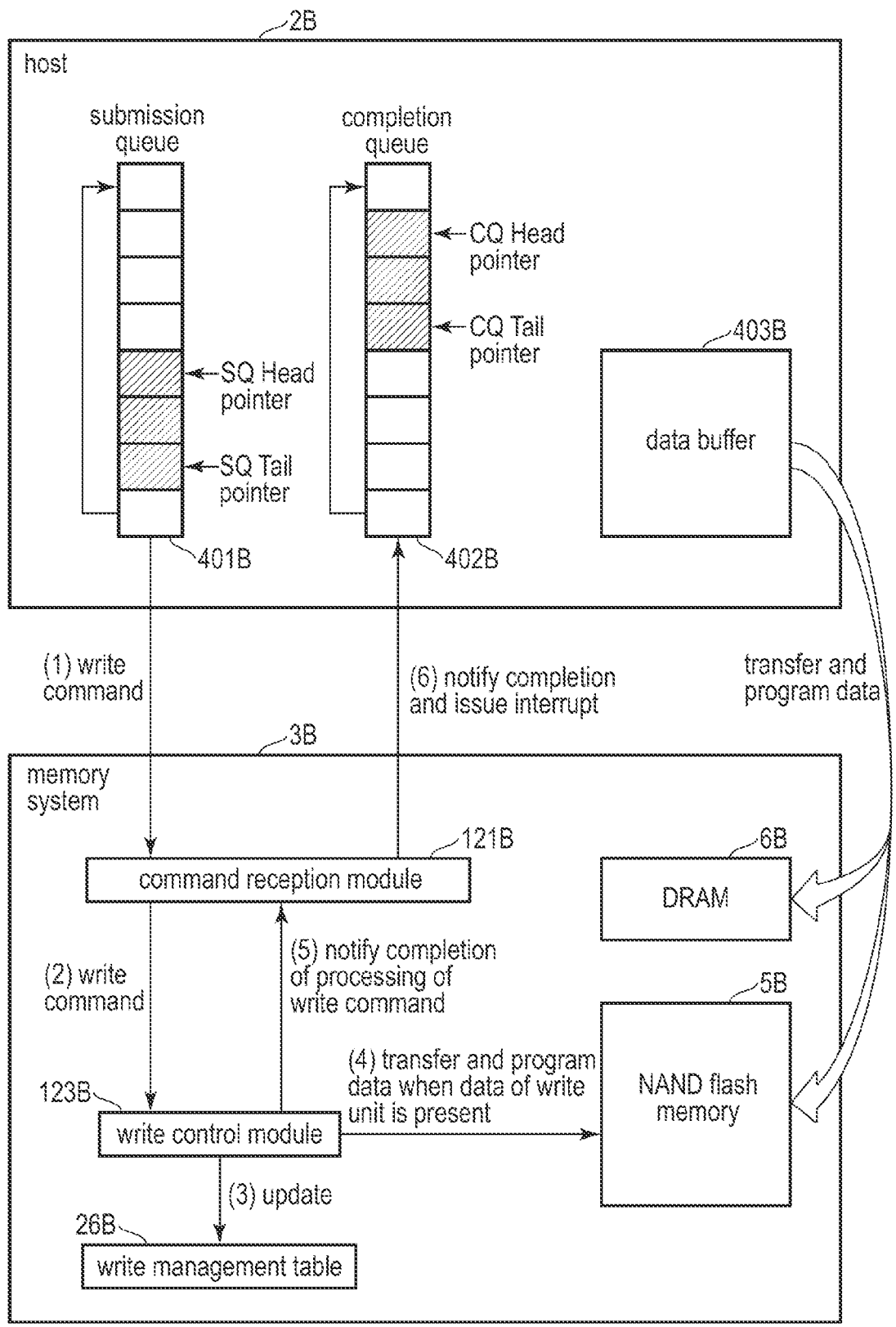
F I G. 10

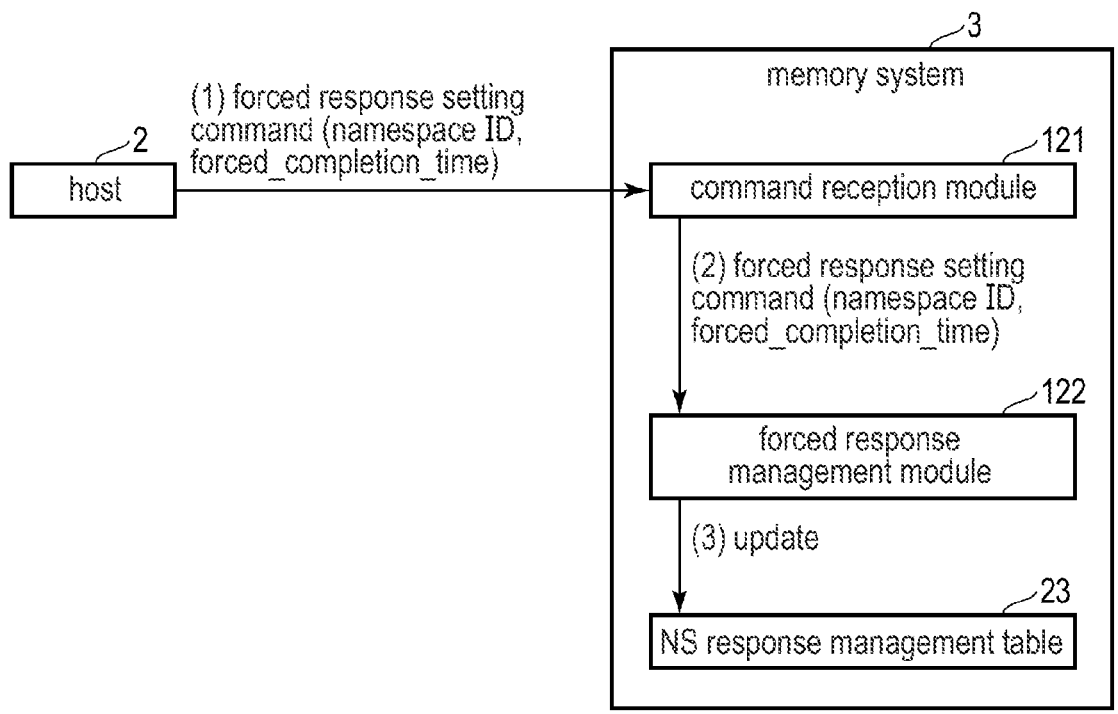
F I G. 11
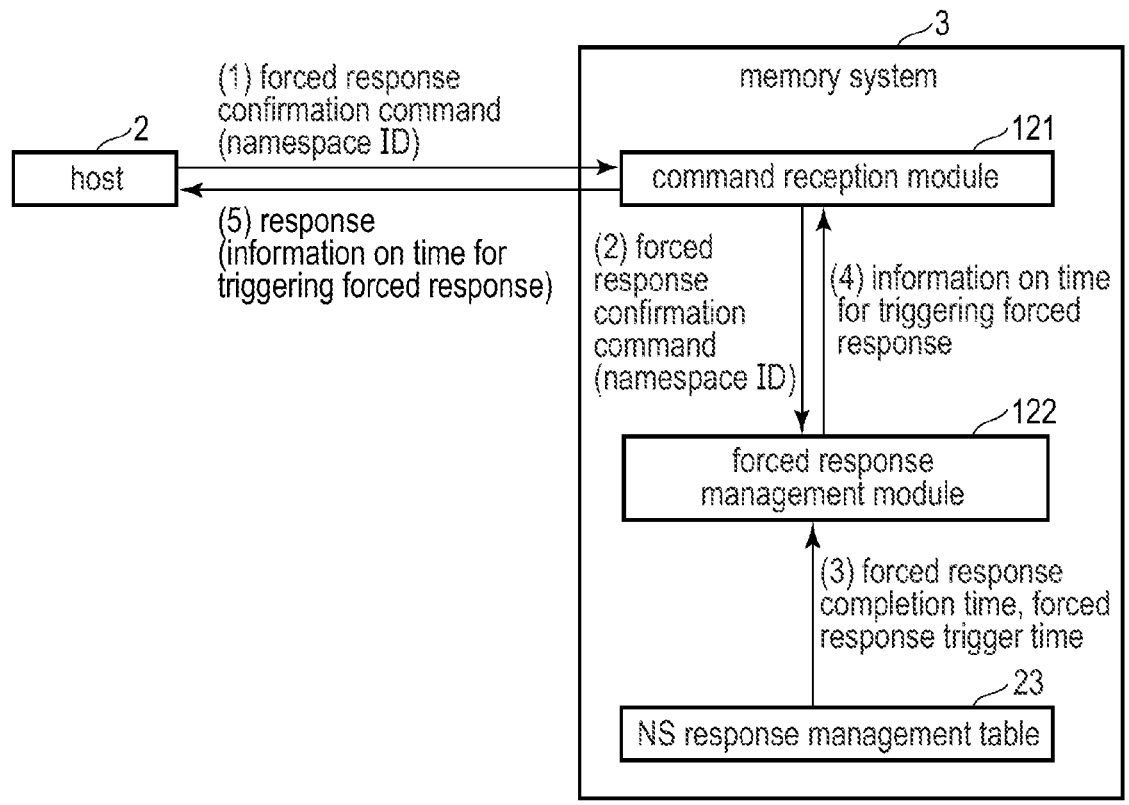
F I G. 12

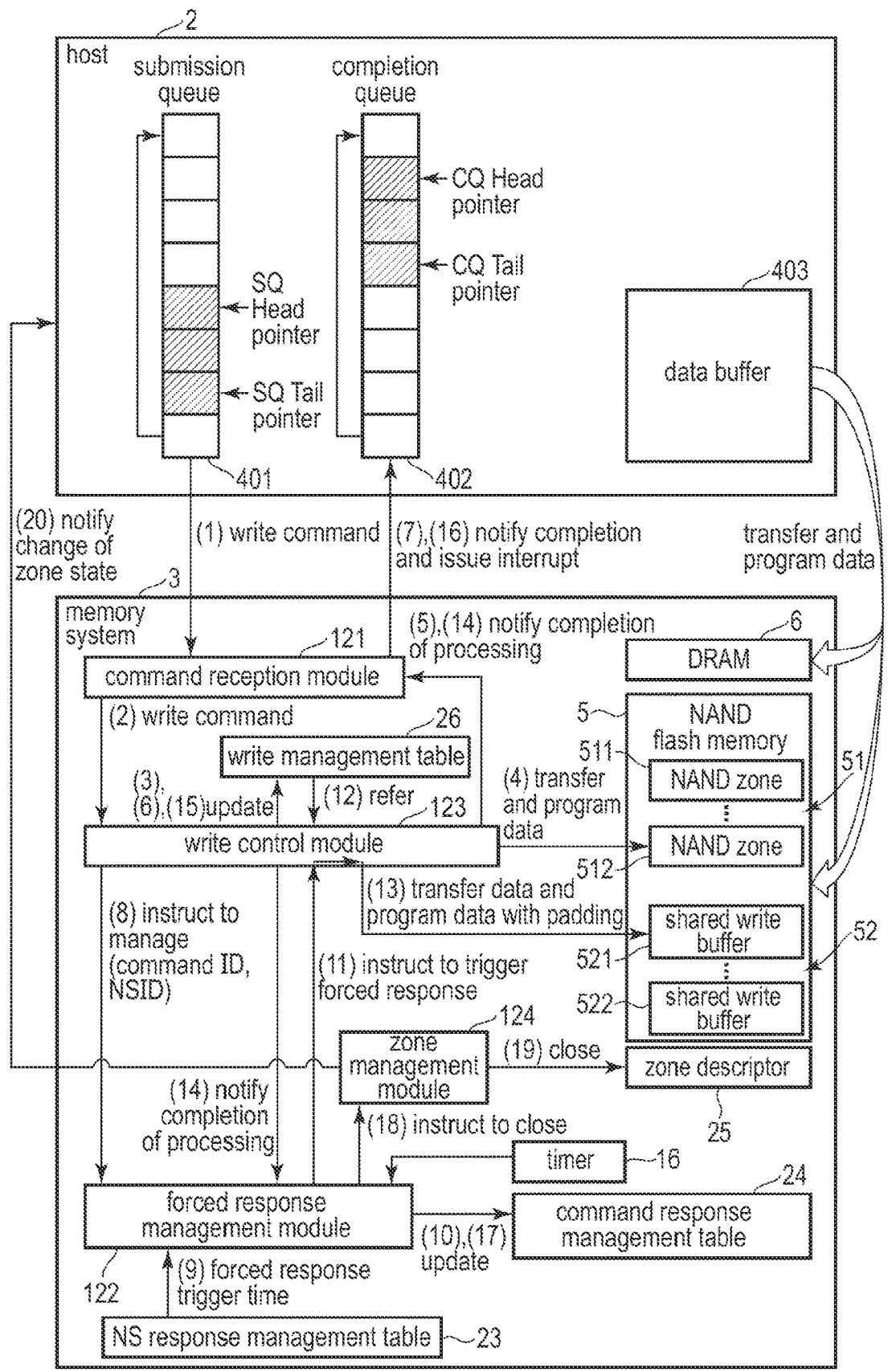
F I G. 13

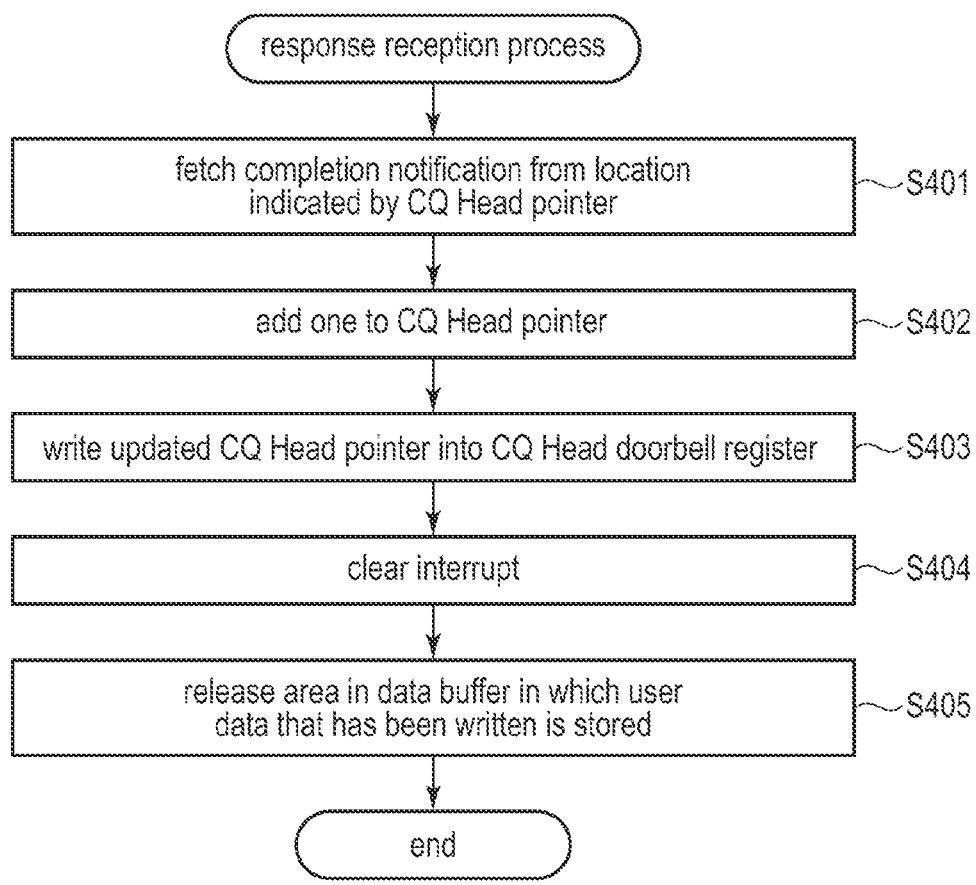
F I G. 17

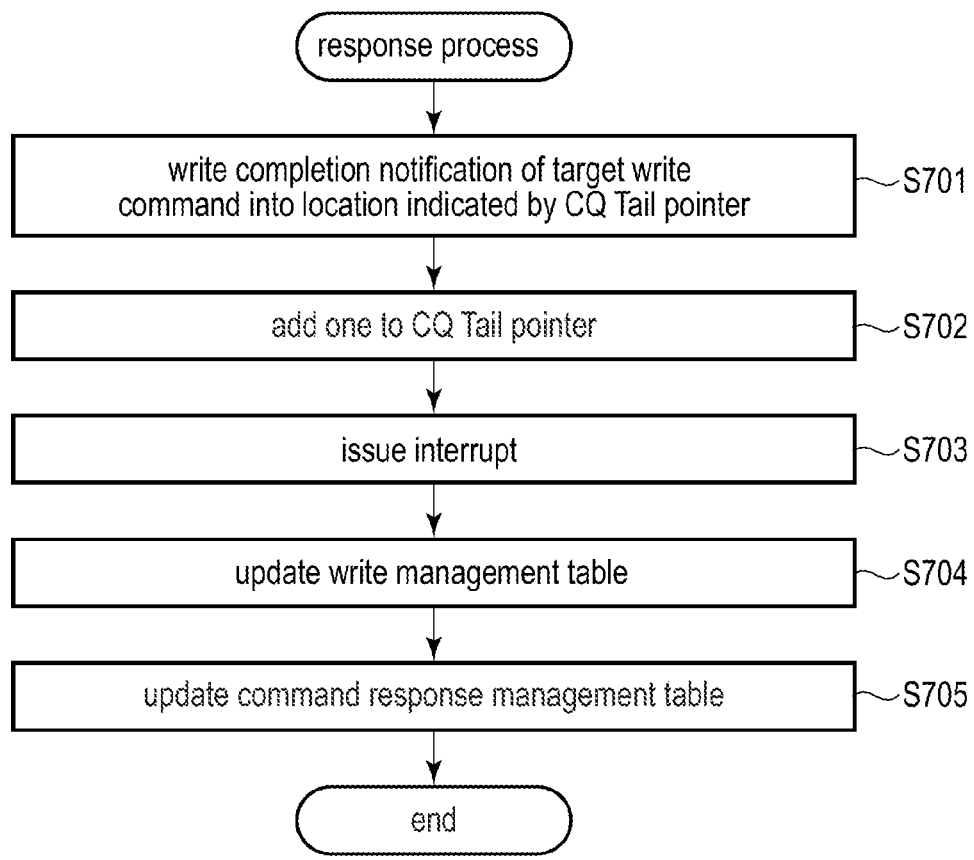
F I G. 20

MEMORY SYSTEM

CROSS-REFERENCE TO RELATED APPLICATIONS

This application is a continuation of U.S. patent application Ser. No. 17/468,163, filed Sep. 7, 2021, which is based upon and claims the benefit of priority from Japanese Patent Application No. 2021-043709, filed Mar. 17, 2021, the entire contents of which are incorporated herein by reference.

FIELD

Embodiments described herein relate generally to a technique for controlling a nonvolatile memory.

BACKGROUND

In recent years, memory systems including a nonvolatile memory are widely used. As one of such memory systems, a solid state drive (SSD) including a NAND flash memory is known. The SSD is used as a main storage for various computing devices.

When receiving a write request from a host, a memory system writes user data, which is received from the host along with the reception of the write request, into a nonvolatile memory, and transmits a response to the host.

Alternatively, after the total amount of user data requested to be written by multiple write requests received from the host reaches a specific data unit, the memory system writes the user data of the specific data unit into the nonvolatile memory, and transmits responses corresponding to the respective write requests to the host. The specific data unit is, for example, the amount of data that can be written into the nonvolatile memory in a single data write operation. That is, the memory system may use a mechanism in which writing in accordance a single write request is not immediately executed but writing in accordance with multiple write requests is executed after the total amount of user data requested to be written by the write requests reaches the specific data unit. Hereinafter, this mechanism is also referred to as a delayed write completion.

In the delayed write completion, for example, user data of a write unit including multiple pieces of user data that correspond to multiple write requests, respectively, is written into the nonvolatile memory, and thus, a storage area of the nonvolatile memory can be efficiently used. In the delayed write completion, however, writing and responding corresponding to each of write requests may be delayed until write requests corresponding to the user data of the write unit are received.

As the memory system does not immediately perform writing and responding corresponding to a write request in response to reception of the write command from the host, there is a possibility that the host is not able to obtain a response to the write request within expected time.

BRIEF DESCRIPTION OF THE DRAWINGS

FIG. 1 is a block diagram illustrating an example of a configuration of an information processing system that includes a memory system according to an embodiment.

FIG. 2 is a view illustrating an example of a configuration of a zoned namespace managed in the memory system of the embodiment.

FIG. 7 is a view illustrating an example of a configuration of a command response management table used in the memory system of the embodiment.

FIG. 8 is a view illustrating an example of a configuration of a write management table used in the memory system of the embodiment.

FIG. 10 is a block diagram illustrating an example of an operation in accordance with a write command in a memory system according to a second comparative example.

FIG. 11 is a block diagram illustrating an example of an operation in accordance with a forced response setting command in the memory system of the embodiment.

FIG. 12 is a block diagram illustrating an example of an operation in accordance with a forced response confirmation command in the memory system of the embodiment.

FIG. 13 is a block diagram illustrating an example of an operation in accordance with a write command in the memory system of the embodiment.

FIG. 17 is a flowchart illustrating an example of the procedure of a response reception process executed by the host in the information processing system in FIG. 1.

FIG. 20 is a flowchart illustrating an example of the procedure of a response process executed in the memory system of the embodiment.

DETAILED DESCRIPTION

Figures 3, 4, 5, 6:
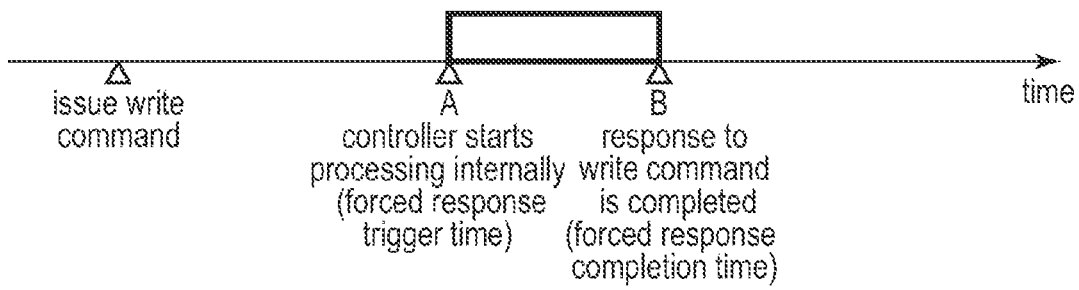
FIG. 3 is a time chart illustrating an example of a sequence in a case where processing in accordance with a write command is executed by triggering a forced response in the memory system of the embodiment.
FIG. 4 is a view illustrating an example of parameters used to control triggering of the forced response in the memory system of the embodiment.
FIG. 5 is a view illustrating an example of a configuration of a logical-to-physical address conversion table used in the memory system of the embodiment.
FIG. 6 is a view illustrating an example of a configuration of a namespace response management table used in the memory system of the embodiment.

Various embodiments will be described hereinafter with reference to the accompanying drawings.

In general, according to one embodiment, a memory system includes a nonvolatile memory and a controller. The controller receives a first write request associated with first data from a host. The first data has a size less than a first data unit that is a write unit to the nonvolatile memory. In response to a lapse of first time since the reception of the first write request, the controller starts a write process of second data to the nonvolatile memory. The second data includes at least the first data. The controller transmits a first response to the first write request to the host in response to completion of the write process. The first time is time obtained by subtracting second time from third time. The third time is designated by the host as a time limit of the transmission of the first response since the reception of the first write request.

First, a configuration of an information processing system 1 that includes a memory system according to an embodiment will be described with reference to FIG. 1. The information processing system 1 includes a host device 2 (hereinafter, referred to as host 2) and a memory system 3.

The host 2 is an information processing apparatus. The host 2 may be a storage server that stores a large amount of various data in the memory system 3, or may be a personal computer.

The memory system 3 is a semiconductor storage device configured to write data to a nonvolatile memory, such as a NAND flash memory, and read data from the nonvolatile memory. The memory system is also referred to as a storage device. The memory system is realized as, for example, a solid state drive (SSD).

The memory system 3 may be used as a storage of the host 2. The memory system 3 may be provided inside the host 2 or may be connected to the host 2 via a cable or a network.

An interface for connecting the host 2 and the memory system 3 conforms to standards such as small computer system interface (SCSI), serial attached SCSI (SAS), AT attachment (ATA), serial ATA (SATA), PCI Express (PCIe) (registered trademark), Ethernet (registered trademark), Fibre channel, or NVM Express (NVMe) (registered trademark).

The memory system 3 includes, for example, a controller 4, a NAND flash memory 5, and a dynamic random access memory (DRAM) 6. The controller 4 may be realized with a circuit such as a system-on-a-chip (SoC). The controller 4 may include a static random access memory (SRAM). The DRAM 6 may be provided inside the controller 4.

A RAM, such as the DRAM 6, includes, for example, a storage area of a firmware (FW) 21, a cache area of a logical-to-physical address conversion table 22, and storage areas of a namespace response management table (NS response management table) 23, a command response management table 24, a zone descriptor 25, and a write management table 26.

The FW 21 is a program for controlling an operation of the controller 4. The FW 21 is loaded from the NAND flash memory 5 to the DRAM 6, for example.

The logical-to-physical address conversion table 22 manages mapping between each logical address and each physical address of the NAND flash memory 5.

The NS response management table 23 manages information on time within which a response to a write command (write request) needs to be transmitted to the host 2, for example, for each namespace.

The command response management table 24 manages time for forcibly starting processing for a received write command.

The zone descriptor 25 includes information indicative of a configuration and a state of each zone.

The write management table 26 manages information on a received write command.

The NAND flash memory 5 includes multiple blocks B0 to Bm−1. Each of the blocks B0 to Bm−1 includes multiple pages (here, pages P0 to Pn−1). The blocks B0 to Bm−1 each function as a minimum data erase unit. The block may also be referred to as an erase block or a physical block. Each of the pages P0 to Pn−1 includes memory cells connected to a single word line. The pages P0 to Pn−1 each function as a unit of a data write operation and a data read operation. Note that a word line may function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data write operation to write data in each page of the block.

The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping data indicative of relationship between each logical address and each physical address of the NAND flash memory 5, and (2) process to hide a difference between read/write operations executed in units of page and erase operations executed in units of block. The block management includes management of defective blocks, wear leveling, and garbage collection.

The logical address is an address used by the host 2 for addressing the memory system 3. The logical address is, for example, a logical block address (LBA). Hereinafter, a case where the LBA is used as the logical address will be mainly explained.

Management of mapping between each LBA and each physical address is executed using the logical-to-physical address conversion table 22. The controller 4 uses the logical-to-physical address conversion table 22 to manage the mapping between each LBA and each physical address with a certain management size. A physical address corresponding to an LBA indicates a physical memory location in the NAND flash memory 5 to which data of the LBA is written. The controller 4 manages multiple storage areas that are obtained by logically dividing the storage area of the NAND flash memory 5, using the logical-to-physical address conversion table 22. The multiple storage areas correspond to multiple LBAs, respectively. That is, each of the storage areas is specified by one LBA. The logical-to-physical address conversion table 22 may be loaded from the NAND flash memory 5 to the DRAM 6 when the memory system 3 is powered on.

Data write into one page is executable only once in a single P/E cycle. Thus, the controller 4 writes updated data corresponding to an LBA not to an original physical memory location in which previous data corresponding to the LBA is stored but to a different physical memory location. Then, the controller 4 updates the logical-to-physical address conversion table 22 to associate the LBA with the different physical memory location than the original physical memory location and to invalidate the previous data. Data to which the logical-to-physical address conversion table 22 refers (that is, data associated with an LBA) will be referred to as valid data. Furthermore, data not associated with any LBA will be referred to as invalid data. The valid data is data to possibly be read by the host 2 later. The invalid data is data not to be read by the host 2 anymore.

The controller 4 may include a host interface (host I/F) 11, a CPU 12, a NAND interface (NAND I/F) 13, a DRAM interface (DRAM I/F) 14, and a timer 16. The host I/F 11, the CPU 12, the NAND I/F 13, the DRAM I/F 14, and the timer 16 may be connected via a bus 10.

The host I/F 11 functions as a circuit that receives various commands, for example, input/output (I/O) commands and various control commands from the host 2. The I/O commands may include a write command, a read command, and a verify command. The control commands may include an unmap command (also referred to as a trim command or a de-allocate command), a format command, a setting command, and a confirmation command. The format command is a command for unmapping all the LBAs in the memory system 3 entirely. The setting command is a command for setting various parameters in the memory system 3. The confirmation command is a command for confirming various parameters set in the memory system 3.

The NAND I/F 13 electrically connects the controller 4 and the NAND flash memory 5. The NAND I/F 13 conforms to an interface standard such as a toggle double data rate (DDR) and an open NAND flash interface (ONFI).

The NAND I/F 13 functions as a NAND control circuit configured to control the NAND flash memory 5. The NAND I/F 13 may be connected to memory chips in the NAND flash memory 5 via multiple channels (Ch). By operating the memory chips in parallel, it is possible to broaden an access bandwidth between the controller 4 and the NAND flash memory 5.

The DRAM I/F 14 functions as a DRAM control circuit configured to control access of the DRAM 6. The storage area of the DRAM 6 is allocated to areas for storing the FW 21, the logical-to-physical address conversion table 22, the NS response management table 23, the command response management table 24, the zone descriptor 25, and the write management table 26, and a buffer area used as a read/write buffer.

The timer 16 measures time. The timer 16 may provide the measured time to each unit in the controller 4.

The CPU 12 is a processor configured to control the host I/F 11, the NAND I/F 13, the DRAM I/F 14, and the timer 16. The CPU 12 performs various processes by executing the FW 21 loaded from the NAND flash memory 5 onto the DRAM 6. The FW 21 is a control program including instructions for causing the CPU 12 to execute the various processes. The CPU 12 may perform command processes to execute various commands from the host 2. The operation of the CPU 12 is controlled by the FW 21.

The function of each unit in the controller 4 may be realized by a dedicated hardware in the controller 4 or may be realized by the CPU 12 executing the FW 21.

The CPU 12 functions as, for example, a command reception module 121, a forced response management module 122, a write control module 123, and a zone management module 124. The CPU 12 functions as these modules, for example, by executing the FW 21. Specific operations of these modules will be described later with reference to FIGS. 11 to 13.

Here, a namespace and a zone will be explained. The whole of a logical address space (an LBA space) used by the host 2 to access the memory system 3 may be divided into multiple subspaces. Each subspace may be referred to as a namespace.

The controller 4 manages data stored in the NAND flash memory 5, for example, for each zone. As a method for managing data stored in the NAND flash memory 5 in units of zones, the controller 4 may use, for example, Zoned Namespace (ZNS) defined in the NVMe standard.

FIG. 2 illustrates an example of a configuration of the ZNS. In the ZNS, the whole of an LBA space corresponding to one namespace may be divided into a set of zones. Each of the zones may include multiple LBAs. Each of the zones, which is obtained by dividing the namespace, corresponds to an LBA range that includes contiguous and non-overlapping LBAs. Each zone is used as a unit for accessing the NAND flash memory 5.

In the example illustrated in FIG. 2, the namespace corresponds to z LBAs (LBA 0 to LBA (z−1)) and includes x zones (zone 0 to zone (x−1)). LBA 0 is the lowest LBA of zone 0. Further, LBA (z−1) is the highest LBA in zone (x−1).

Writing in a zone is sequentially executed. That is, the writing in a zone is executed such that LBAs are contiguous. A zone may correspond to any physical unit in the NAND flash memory 5. For example, a zone corresponds to a block in the NAND flash memory 5. In this case, data in the block is accessed using contiguous LBAs included in an LBA range allocated to the zone.

States that each zone may be in include an opened state, a full state, and a closed state. A zone in the opened state is a zone in which data is writable. A zone in the full state is a zone in which data has been written fully. A zone in the closed state is a zone in which data writing is interrupted.

Note that the zone descriptor 25 corresponding to a zone includes, for example, information such as a start LBA of the zone (that is, the lowest LBA), the writable capacity of data to the zone, and a state of the zone.

In a case where there is a write command whose elapsed time since reception exceeds a threshold while the controller 4 performs writing according to the delayed write completion, the controller 4 forcibly performs processing in accordance with the write command and responds to the host 2.

Hereinafter, forcibly starting processing in accordance with a write command whose elapsed time since reception exceeds the threshold is also referred to as triggering a forced response.

A write command is a command that requests writing of user data associated with the write command into the NAND flash memory 5. The processing in accordance with the write command is a process of writing user data associated with the write command to the NAND flash memory 5.

The delayed write completion is a mechanism in which writing in accordance with a received write command is not immediately executed but writing in accordance with multiple write commands is executed after the total amount of user data requested to be written in a zone by the write commands reaches a write unit, and then responding to the host 2 is executed. The write unit corresponds to the amount of data that is writable to the NAND flash memory 5 in a single data write operation. The write unit corresponds to, for example, the amount of data of one page. In a case where multiple bits of data is stored in one memory cell, the write unit may correspond to the amount of data of multiple pages.

Data may be written into the NAND flash memory 5 under a quad-level cell (QLC) method. In the QLC method, 4-bit data is stored per memory cell. In the QLC method, a write operation having multiple steps may be performed. The write operation having the multiple steps is, for example, a foggy-fine write operation.

The foggy-fine write operation is a write operation in which reading of data that has been written in one page is enabled after writing of data to one or more pages that are included in the same block as the one page and are subsequent to the one page. The foggy-fine write operation includes multiple write operations for a set of memory cells connected to a single word line. The first write operation is a write operation for coarsely setting a threshold voltage of each memory cell, and is referred to as a foggy write operation. The second write operation is a write operation for adjusting the threshold voltage of each memory cell, and is referred to as a fine write operation. The foggy-fine write operation can reduce the influence of program disturb.

In a case where data is written into the NAND flash memory 5 by the foggy-fine write operation in the QLC method, the write unit corresponds to the data amount of four pages.

Triggering of a forced response in the memory system 3 will be specifically described with reference to FIGS. 3 and 4.

FIG. 3 illustrates an example of a sequence in a case where processing in accordance with a write command is executed by triggering the forced response in the memory system 3. Hereinafter, a case where triggering of the forced response is managed for each namespace will be described. Note that triggering of the forced response may be managed in units of various storage areas without being limited to the units of namespaces.

The controller 4 receives a write command issued by the host 2. When time A has elapsed since the reception of the write command, the controller 4 forcibly starts processing in accordance with the write command (that is, triggers a forced response). As a result, the controller 4 can complete the response to the write command by time B since the reception of the write command.

FIG. 4 illustrates an example of parameters used to control triggering of the forced response in the memory system 3. The parameters used to control triggering of the forced response include, for example, forced_completion_time and process_time.

The forced_completion_time is a parameter for determining whether to trigger the forced response and determining an upper limit of time between reception of a write command by the controller 4 and completion of a response to the write command (corresponding to the time B in FIG. 3) in a case where the forced response is to be triggered. The upper limit of time between reception of the write command and completion of the response to the write command is also referred to as forced response completion time.

In the memory system 3, whether to set a value to the forced_completion_time is freely determined. A value of the forced_completion_time m indicates the forced response completion time set by a user. The user may set the value of the forced_completion_time m by issuing a forced response setting command through the host 2.

The forced response setting command is a command for requesting setting of time for triggering the forced response. In the forced response setting command, identification information for identifying a namespace (namespace ID) and the value of the forced_completion_time m are designated. The forced response setting command is realized, for example, as a Set Features command defined in the NVMe standard. Hereinafter, the forced response setting command is also referred to as a setting command.

For example, in a case where the value of the forced_completion_time m is zero, the controller 4 does not trigger the forced response to a write command. Note that the controller 4 does not trigger the forced response to a write command when the setting according to the setting command has not been performed (that is, in a default state).

In a case where the value of the forced_completion_time m is one or more, the controller 4 determines the forced response completion time by using the value of the forced_completion_time m. The forced response completion time indicates an upper limit of response time to a write command expected by the host 2. The forced response completion time is, for example, m×100 milliseconds. That is, the controller 4 completes a response to a write command within m×100 milliseconds since reception of the write command. The controller 4 commonly manages a value of the forced_completion_time m for each of zones included in a corresponding namespace. That is, a value of the forced_completion_time m is commonly set for zones included in a namespace.

The process_time is a parameter indicating time in which the processing in accordance with a write command is executed and used for determining time between reception of a write command by the controller 4 and forcible start of processing in accordance with the write command (corresponding to the time A in FIG. 3) in a case where the forced response is to be triggered. The time between reception of the write command and forcible start of processing in accordance with the write command is also referred to as forced response trigger time.

In the memory system 3, whether a value is set to the process_time is freely determined. Further, a value of the process_time n may be set, for example, before shipment of the memory system 3.

In a case where a value of the process_time n is set, the controller 4 determines the forced response trigger time by using the value of the forced_completion_time m and the value of the process_time n in accordance with reception of the setting command. The forced response trigger time is, for example, (m −n)×100 milliseconds. That is, when (m−n)× 100 milliseconds have elapsed since reception of a write command, the controller 4 forcibly starts processing in accordance with the write command.

Note that n×100 milliseconds corresponds to, for example, time within which corresponding user data becomes readable from the NAND flash memory 5 (hereinafter, also referred to as process time) since forcible start of processing (write process) in accordance with the write command. Accordingly, the forced response trigger time is obtained by subtracting the process time from the forced response completion time.

The write process includes a process of transferring user data from the controller 4 to the NAND flash memory 5 and a process of programming the user data to memory cells in the NAND flash memory 5. The write process is completed when the user data becomes readable from the NAND flash memory 5.

In this way, in the memory system 3, triggering of a forced response to a received write command can be controlled on the basis of the value of the forced_completion_time m set by the user. More specifically, the controller 4 can determine the forced response completion time and the forced response trigger time by using the value of the forced_completion_time m and the value of the process_time n. When the forced response trigger time has elapsed since reception of a write command from the host 2, the controller 4 forcibly starts writing of user data corresponding to the write command into the NAND flash memory 5. As a result, the controller 4 can respond to the write command within the forced response completion time expected by the host 2.

Next, several tables used in the memory system 3 will be described with reference to FIGS. 5 to 8.

FIG. 5 illustrates an example of a configuration of the logical-to-physical address conversion table 22. The logical-to-physical address conversion table 22 manages mapping between each LBA and each physical address of the NAND flash memory 5. The controller 4 may convert an LBA into a physical address using the logical-to-physical address conversion table 22. Further, the controller 4 may convert a physical address into an LBA using the logical-to-physical address conversion table 22.

In the example illustrated in FIG. 5, a physical address "X", a physical address "Y", and a physical address "Z" are mapped to an LBA "0", an LBA "1", and an LBA "2", respectively.

FIG. 6 illustrates an example of a configuration of the NS response management table 23. The NS response management table 23 may include one or more entries that correspond to one or more namespaces, respectively. Each of the entries includes, for example, a namespace ID field, a forced response completion time field, and a forced response trigger time field.

In an entry corresponding to a certain namespace, the namespace ID field indicates identification information assigned to the certain namespace (namespace ID). The controller 4 is capable of specifying a corresponding namespace using the namespace ID.

The forced response completion time field indicates an upper limit of time within which the controller 4 responds to a write command (that is, the forced response completion time) in a case where the corresponding namespace includes a write destination of the write command. Note that a namespace includes a write destination of a write command when an LBA designated in the write command is included in an LBA space of the namespace. The controller 4 is configured to transmit a response to the write command to the host 2 within the time indicated in the forced response completion time field since reception of the write command. In the forced response completion time field, the time is set in units of milliseconds, for example.

The forced response trigger time field indicates time when the controller 4 starts a process in accordance with a write command (that is, the forced response trigger time) in a case where the corresponding namespace includes the write destination of the write command. That is, when the time indicated in the forced response trigger time field has elapsed since the reception of the write command, the controller 4 starts processing in accordance with the write command. In the forced response trigger time field, the time is set in units of milliseconds, for example.

In the example illustrated in FIG. 6, the forced response completion time "20000" and the forced response trigger time "15000" are associated with a namespace ID "1".

In the following description regarding the NS response management table 23, a value indicated in the namespace ID field is also simply referred to as a namespace ID. The same applies to values indicated in the other fields of the NS response management table 23 and values indicated in the fields of the other tables.

FIG. 7 illustrates an example of a configuration of the command response management table 24. The command response management table 24 may include one or more entries that correspond to one or more write commands, respectively. Each entry includes, for example, a command ID field and a time until triggering field.

In an entry corresponding to a certain write command, the command ID field indicates identification information assigned to the certain write command. Identification information assigned to a write command is also referred to as a command ID. The controller 4 is capable of specifying a corresponding write command using the command ID.

The time until triggering field indicates remaining time until a process in accordance with the corresponding write command is forcibly started. Specifically, for example, the forced response trigger time set for a namespace that includes a write destination of the write command is set as an initial value of the time until triggering field. The controller 4 decreases the time set in the time until triggering field according to a lapse of time measured by the timer 16, for example. When the time set in the time until triggering field becomes zero, the process in accordance with the write command is forcibly started. In the time until triggering field, the time is set in units of milliseconds, for example.

In the example illustrated in FIG. 7, the time until triggering "1200" is associated with a command ID "11", and the time until triggering "10000" is associated with a command ID "12".

FIG. 8 illustrates an example of a configuration of the write management table 26. The write management table 26 may include one or more entries that correspond to one or more write commands, respectively. Each entry includes, for example, a command ID field, an LBA field, a data length field, a data buffer information field, and a zone field.

The command ID field indicates a command ID of a corresponding write command.

The LBA field indicates an LBA designated in the corresponding write command. The LBA indicates a start LBA of an LBA range in which user data is to be written in accordance with the write command.

The data length field indicates a data length designated in the corresponding write command. The data length indicates the length of the user data that is to be written in accordance with the write command. Accordingly, the LBA range in which the user data is to be written in accordance with the write command is specified using the LBA and the data length designated in the write command.

The data buffer information field indicates data buffer information designated in the corresponding write command. The data buffer information indicates a location in the host 2 where the user data that is to be written in accordance with the write command is stored. That is, the controller 4 transfers the user data from a storage location in the host 2, which is indicated by the data buffer information, to the memory system 3.

The zone field indicates a zone that includes an LBA designated in the corresponding write command. The zone is represented by, for example, a start LBA (that is, the lowest LBA) of an LBA range allocated to the zone. The write management table 26 can manage information on write commands for each zone by using the zone represented in the zone field. Note that the controller 4 may use multiple write management tables 26 for the respective zones, instead of providing the zone field in each entry.

(Operation of Memory System According to Comparative Example)

Here, an example of an operation in accordance with a write command will be described using memory systems according to two comparative examples.

Figure 9:
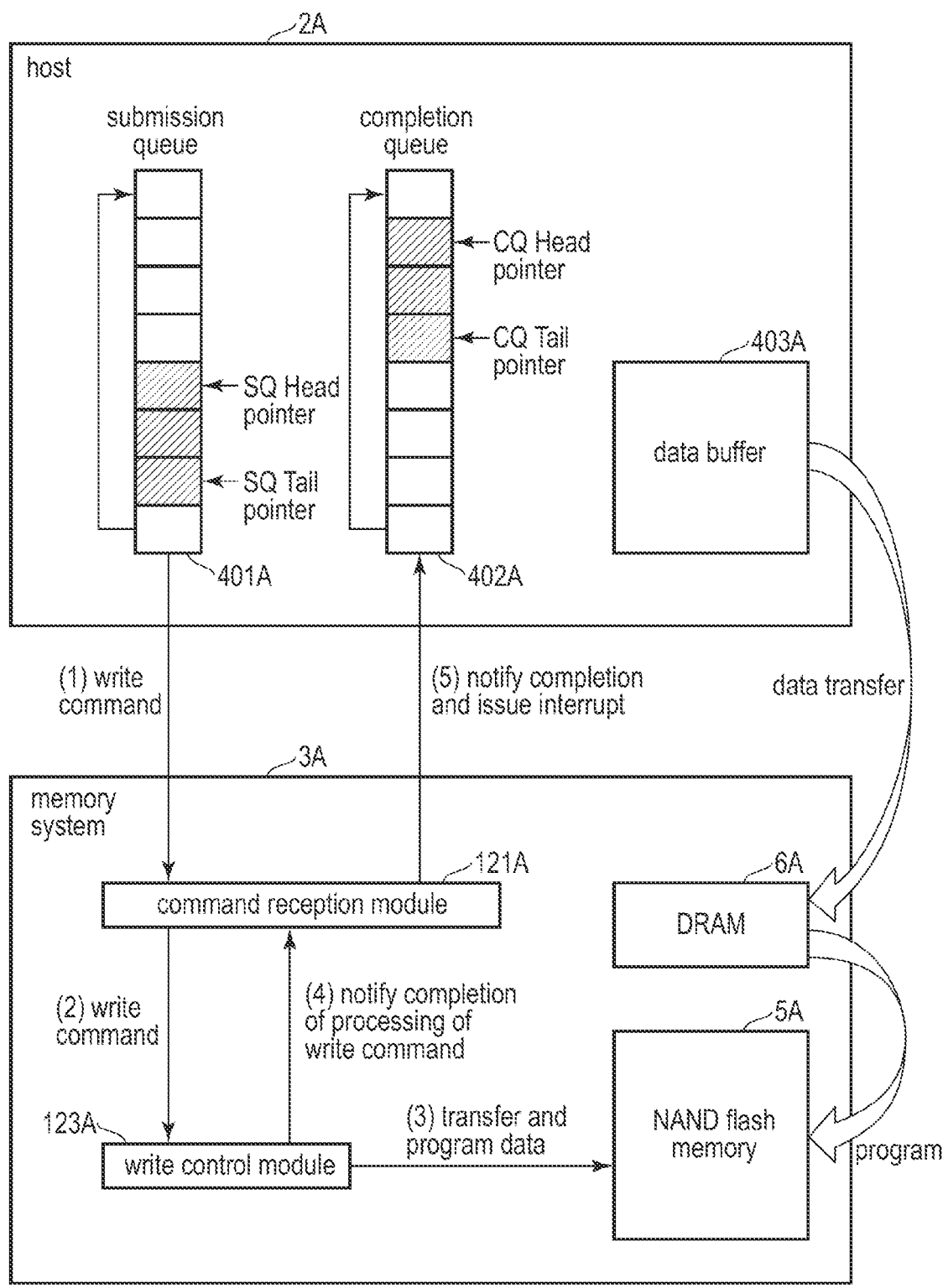
FIG. 9 is a block diagram illustrating an example of an operation in accordance with a write command in a memory system according to a first comparative example.

FIG. 9 is a block diagram illustrating an example of an operation in accordance with a write command in a memory system 3A according to a first comparative example. The memory system 3A of the first comparative example has, for example, a system configuration similar to that of the memory system 3 of the embodiment.

The memory system 3A is configured to perform a process in accordance with a write command whenever receiving a write command issued by a host 2A, and transmit a response to the host 2A. A CPU of the memory system 3A functions as a command reception module 121A and a write control module 123A.

The host 2A includes, for example, a submission queue (SQ) 401A, a completion queue (CQ) 402A, and a data buffer 403A.

The submission queue 401A includes multiple slots to which the host 2A writes commands, respectively, which are to be issued to the memory system 3A. A location in the submission queue 401A (that is, a slot) to which the host 2A should write a command is indicated by an SQ Tail pointer. A location in the submission queue 401A from which the memory system 3A should fetch a command is indicated by an SQ Head pointer.

The completion queue 402A includes multiple slots to which the memory system 3A writes responses to commands, respectively. A location in the completion queue 402A to which the memory system 3A should write a response is indicated by a CQ Tail pointer. A location in the completion queue 402A from which the host 2A should fetch a response is indicated by a CQ Head pointer.

The data buffer 403A is a storage area that temporarily stores user data to be written into a NAND flash memory 5A of the memory system 3A.

An example of a specific operation of the memory system 3A and the host 2A will be described below. Here, a case where commands written to the submission queue 401A are only write commands will be explained for easy understanding.

First, the host 2A stores user data, which is to be written into the NAND flash memory 5A of the memory system 3A, in the data buffer 403A. Then, the host 2A writes a write command to a location in the submission queue 401A indicated by the SQ Tail pointer (that is, issues the write command). This write command is a write command for requesting writing of the user data stored in the data buffer 403A.

Next, the host 2A adds one to the SQ Tail pointer. When the value obtained by adding one to the SQ Tail pointer reaches the number of slots in the submission queue 401A (that is, the queue size), the host 2A sets the SQ Tail pointer to zero. Then, the host 2A writes the updated value of the SQ Tail pointer into an SQ Tail doorbell register of the memory system 3A.

The command reception module 121A of the memory system 3A fetches the write command from a location in the submission queue 401A indicated by the SQ Head pointer ((1) in FIG. 9). When there is a difference between the SQ Head pointer and the SQ Tail pointer, the command reception module 121A fetches a write command from the submission queue 401A. The command reception module 121A adds one to the SQ Head pointer. When the value obtained by adding one to the SQ Head pointer reaches the number of slots in the submission queue 401A, the command reception module 121A sets the SQ Head pointer to zero. The command reception module 121A sends the fetched write command to the write control module 123A ((2) in FIG. 9).

The write control module 123A transfers user data, which is to be written into the NAND flash memory 5A, from the data buffer 403A to a DRAM 6A in accordance with the write command sent by the command reception module 121A. The write control module 123A writes (that is, programs) the transferred user data into the NAND flash memory 5A ((3) in FIG. 9). Then, when the written user data becomes readable, the write control module 123A notifies the command reception module 121A of completion of the processing in accordance with the corresponding write command ((4) in FIG. 9).

In accordance with the notification from the write control module 123A, the command reception module 121A writes a completion notification of the corresponding write command into a location in the completion queue 402A indicated by the CQ Tail pointer, and issues an interrupt ((5) in FIG. 9). The command reception module 121A issues the interrupt to notify the host 2A that a new completion notification to be processed has been stored in the completion queue 402A. Further, the command reception module 121A adds one to the CQ Tail pointer. When the value obtained by adding one to the CQ Tail pointer reaches the number of slots in the completion queue 402A, the command reception module 121A sets the CQ Tail pointer to zero.

In accordance with the interrupt issued by the command reception module 121A, the host 2A fetches the completion notification from a location in the completion queue 402A indicated by the CQ Head pointer. The host 2A adds one to the CQ Head pointer. When the value obtained by adding one to the CQ Head pointer reaches the number of slots in the completion queue 402A, the host 2A sets the CQ Head pointer to zero. The host 2A writes the updated value of the CQ Head pointer into a CQ Head doorbell register of the memory system 3A. The host 2A clears the interrupt received from the memory system 3A. Then, the host 2A releases an area in the data buffer 403A in which the user data that has been written is stored on the basis of the fetched completion notification.

Through the above operation, whenever receiving a write command from the host 2A, the memory system 3A of the first comparative example performs the processing in accordance with the write command and transmits the response (completion notification) to the host 2A. As a result, the memory system 3A of the first comparative example can respond to a write command within time expected by the host 2A.

FIG. 10 is a block diagram illustrating an example of an operation in accordance with a write command in a memory system 3B according to a second comparative example. The memory system 3B of the second comparative example has, for example, a system configuration similar to that of the memory system 3 of the embodiment.

The memory system 3B is configured to write user data of a write unit into a NAND flash memory 5B after the total amount of the user data requested to be written for a zone by write commands reaches the write unit, and transmit responses corresponding to the respective write commands to the host 2B. A CPU of the memory system 3B functions as a command reception module 121B and a write control module 123B.

A configuration and an operation of the host 2B are similar to those of the host 2A in the first comparative example described above with reference to FIG. 9. Note that the host 2B may issue a write command, and then issue a subsequent write command before obtaining a response to the preceding write command. This is because if the host 2B is configured to issue the subsequent write command after waiting for the response to the preceding write command, there is a possibility that deadlock occurs between the host 2B and the memory system 3B that responds after the total amount of user data requested to be written by write commands reaches the write unit.

Hereinafter, an operation of the memory system 3B will be mainly described regarding differences from the memory system 3A of the first comparative example.

The command reception module 121B of the memory system 3B fetches a write command from a location in a submission queue 401B indicated by an SQ Head pointer ((1) in FIG. 10). The command reception module 121B sends the fetched write command to the write control module 123B ((2) in FIG. 10).

The write control module 123B acquires a command ID, an LBA, a data length, and data buffer information, which are designated in the write command, from the write command sent by the command reception module 121B. The write control module 123B specifies a zone including the acquired LBA. The write control module 123B updates a write management table 26B using the acquired command ID, LBA, data length, and data buffer information, and the specified zone ((3) in FIG. 10). The write control module 123B uses the write management table 26B to determine whether user data of the write unit for a zone is stored in a data buffer 403B of the host 2B.

When user data of the write unit for a zone is not stored in the data buffer 403B of the host 2B, the write control module 123B does not write the user data into the NAND flash memory 5B. While user data of the write unit for a zone is not stored in the data buffer 403B of the host 2B, the command reception module 121B may repeatedly fetch a write command from the submission queue 401B.

When user data of the write unit for a zone is stored in the data buffer 403B, the write control module 123B transfers the user data of the write unit from the data buffer 403B to the NAND flash memory 5B, and writes (programs) the transferred user data of the write unit into the NAND flash memory 5B ((4) in FIG. 10). Note that the user data of the write unit to be transferred may be once buffered in a DRAM 6B. Then, when there is a write command for which the corresponding user data is readable from the NAND flash memory 5B, the write control module 123B notifies the command reception module 121B of completion of processing in accordance with the write command ((5) in FIG. 10). The write control module 123B notifies the command reception module 121B of completion of processing in accordance with each of the write commands that correspond to the user data of the write unit.

In accordance with the notification from the write control module 123B, the command reception module 121B writes a completion notification of the corresponding write command into a location in the completion queue 402B indicated by the CQ Tail pointer, and issues an interrupt ((6) in FIG. 10). Operations performed by the command reception module 121B and the host 2B after issuing the interrupt are similar to the operations performed by the command reception module 121A and the host 2A of the first comparative example.

Through the above operation, when the total amount of user data requested to be written for a zone by write commands from the host 2B reaches the write unit, the memory system 3B of the second comparative example writes the user data of the write unit into the NAND flash memory 5B (more specifically, a storage area of the NAND flash memory 5B corresponding to the zone). Then, the memory system 3B transmits responses corresponding to the respective write commands to the host 2B.

The size of user data to be written in accordance with one write command is, for example, smaller than the write unit for the NAND flash memory 5B. When user data of the write unit for a zone is stored in the data buffer 403B, the memory system 3B writes the user data of the write unit into the zone. As a result, the memory system 3B can efficiently use the storage area of the NAND flash memory 5B.

The operation of the memory system 3B corresponds to the delayed write completion. In the delayed write completion, writing and responding for each write command may be delayed until write commands corresponding to user data of the write unit are received. For example, in a case where the host 2B issues a first write command requesting writing of user data less than the write unit and then does not issue a subsequent write command, user data of the write unit is not stored in the data buffer 403B. As a result, there is a possibility that data writing in accordance with the first write command is not started and a response to the host 2B is delayed.

As the memory system 3B does not immediately perform writing and responding for a write command in response to reception of the write command from the host 2B, there is a possibility that the host 2B is not able to obtain a response to the write command within expected time. In this case, there is a possibility that the write command stalls, and there may occur a problem that writing of user data from the host 2B to the memory system 3B does not function.

However, immediately performing writing and responding for a write command in response to reception of the write command conflicts with the delayed write completion.

Therefore, the memory system 3 of the embodiment is configured to respond to a write command within time expected by the host 2 while performing writing according to the delayed write completion. Specifically, when elapsed time since reception of a write command has reached the forced response trigger time, the controller 4 of the memory system 3 writes user data corresponding to the write command not into a storage area of the NAND flash memory 5 that corresponds to a zone including an LBA designated in the write command, but into a shared write buffer provided in the NAND flash memory 5. Then, the controller 4 transitions the zone, which includes the LBA designated in the write command, to the closed state. The forced response trigger time is set such that processing in accordance with the write command can be completed within time expected by the host 2 (i.e., the forced response completion time). Therefore, the controller 4 can respond to the write command within the time expected by the host 2.

Further, when the total amount of user data that is to be written into a zone and is stored in the data buffer 403 reaches the write unit before elapsed time since reception of a corresponding write command reaches the forced response trigger time, the controller 4 writes the user data of the write unit into the zone. That is, the controller 4 performs writing according to the delayed write completion.

Therefore, the controller 4 can efficiently use the storage area of the NAND flash memory 5 while responding to a write command within the time expected by the host 2. As a result, it is possible to provide the memory system 3 at low cost by a combination of the delayed write completion and a flash memory that requires a write operation having multiple steps such as a QLC flash memory. In addition, compatibility with an existing software stack can also be maintained.

Specific operation examples of the memory system 3 of the embodiment will be described with reference to FIGS. 11 to 13.

FIG. 11 is a block diagram illustrating an example of an operation in accordance with the forced response setting command (setting command) in the memory system 3.

The host 2 transmits (issues) the setting command to the memory system 3 ((1) in FIG. 11). For example, a namespace ID and a value of the forced_completion_time m are designated in the setting command.

The command reception module 121 of the memory system 3 receives the setting command transmitted by the host 2. Then, the command reception module 121 sends the setting command to the forced response management module 122 ((2) in FIG. 11).

The forced response management module 122 updates the NS response management table 23 in accordance with the setting command ((3) in FIG. 11). The forced response management module 122 determines the forced response completion time and the forced response trigger time by using the value of the forced_completion_time m designated in the setting command. Then, the forced response management module 122 generates an entry indicative of the forced response completion time and the forced response trigger time that are associated with the namespace ID designated in the setting command, and adds the entry to the NS response management table 23.

More specifically, the forced response management module 122 first acquires the namespace ID and the value of the forced_completion_time m that are designated in the setting command. Here, a namespace specified by the acquired namespace ID is referred to as a target namespace.

When the value of the forced_completion_time m is equal to or greater than one, the forced response management module 122 updates the NS response management table 23 so as to respond to a write command whose write destination is the target namespace within the forced response completion time based on the value of the forced_completion_time m. More specifically, the forced response management module 122 calculates, for example, m×100 milliseconds as the forced response completion time.

The forced response management module 122 acquires a value of the process_time n. The value of the process_time n is determined before shipment of the memory system 3, for example. The value of the process_time n is stored in, for example, the NAND flash memory 5. Then, the forced response management module 122 calculates, for example, (m−n)×100 milliseconds as the forced response trigger time. Note that an example in which m and n are designated as time in units of 100 milliseconds has been described here, m and n may be represented by values in any unit as long as the forced response completion time and the forced response trigger time can be calculated.

Next, the forced response management module 122 determines whether the calculated forced response completion time and forced response trigger time are valid values. For example, when the calculated forced response completion time is shorter than program time tProg for the NAND flash memory 5, the forced response management module 122 determines that the forced response completion time is an invalid value. For example, when the calculated forced response trigger time is a value of zero or less (that is, when m is n or less), the forced response management module 122 determines that the forced response trigger time is an invalid value. Further, for example, when the calculated forced response completion time exceeds Finish Recommended Limit (FRL) defined in the NVMe standard, the forced response management module 122 determines that the forced response completion time is an invalid value. The FRL is an internal parameter of the memory system 3. The FRL indicates a time limit until a zone becomes the full state since the zone transitions to the opened state.

When at least one of the calculated forced response completion time and forced response trigger time is an invalid value, the forced response management module 122 may notify the host 2 of an error of the setting command.

When the calculated forced response completion time and forced response trigger time are valid values, the forced response management module 122 adds an entry indicating the acquired namespace ID and the calculated forced response completion time and forced response trigger time to the NS response management table 23. Note that, in a case where the entry corresponding to the acquired namespace ID already exists in the NS response management table 23, the entry is updated using the calculated forced response completion time and forced response trigger time.

When the value of the forced_completion_time m designated in the setting command is zero, the forced response management module 122 updates the NS response management table 23 so as not to trigger the forced response. More specifically, when the value of the forced_completion_time m is zero and the entry corresponding to the namespace ID designated in the setting command already exists in the NS response management table 23, the forced response management module 122 deletes the entry from the NS response management table 23. Further, when the value of the forced_completion_time m is zero and no entry corresponding to the namespace ID designated in the setting command exists in the NS response management table 23, the forced response management module 122 does not add an entry corresponding to the namespace ID to the NS response management table 23.

With the above configuration, the memory system 3 can control triggering of the forced response to a write command for each namespace in accordance with the setting command received from the host 2.

FIG. 12 is a block diagram illustrating an example of an operation in accordance with a forced response confirmation command in the memory system 3. The forced response confirmation command is a command requesting to provide information on time that is to elapse until the forced response to a write command is triggered. The forced response confirmation command is realized as, for example, a Get Features command defined in the NVMe standard. Hereinafter, the forced response confirmation command is also referred to as a confirmation command.

The host 2 transmits the confirmation command to the memory system 3 ((1) in FIG. 12). For example, a namespace ID is designated in the confirmation command.

The command reception module 121 of the memory system 3 receives the confirmation command transmitted by the host 2. Then, the command reception module 121 sends the confirmation command to the forced response management module 122 ((2) in FIG. 12).

In accordance with the confirmation command, the forced response management module 122 acquires information on time for triggering the forced response from the NS response management table 23 ((3) in FIG. 12). Specifically, first, the forced response management module 122 acquires the namespace ID designated in the confirmation command. The forced response management module 122 specifies an entry in the NS response management table 23 that includes the acquired namespace ID. Then, the forced response management module 122 acquires at least one of the forced response completion time and the forced response trigger time from the specified entry.

The forced response management module 122 generates information on time for triggering the forced response by using at least one of the forced response completion time and the forced response trigger time, and sends the information to the command reception module 121 ((4) in FIG. 12). This information indicates, for example, at least one of the forced response completion time and the forced response trigger time. Alternatively, this information may indicate information related to at least one of the forced response completion time and the forced response trigger time (for example, a value of the forced_completion_time m, a value of the process_time n).

Then, the command reception module 121 transmits, to the host 2, a response including the information on the time for triggering a forced response ((5) in FIG. 12).

With the above configuration, the memory system 3 can provide the host 2 with information on time for triggering the forced response corresponding to a designated namespace in accordance with a confirmation command received from the host 2.

FIG. 13 is a block diagram illustrating an example of an operation in accordance with a write command in the memory system 3.

The controller (see controller 4 of FIG. 1) of the memory system 3 is configured to forcibly start writing user data into the NAND flash memory 5 when elapsed time since reception of a corresponding write command reaches the forced response trigger time while performing writing according to the delayed write completion. When the written user data becomes readable, the controller transmits a response, which indicates that processing in accordance with the corresponding write command has been completed, to the host 2.

The controller manages at least one storage area in the NAND flash memory 5 corresponding to at least one zone (referred to as a NAND zone 51) and at least one shared write buffer 52. The NAND zone 51 is a storage area obtained by logically dividing the storage area of the NAND flash memory 5. The shared write buffer 52 is a storage area in which user data to be written into the at least one NAND zone 51 is stored in a nonvolatile way.

The at least one NAND zone 51 is, for example, associated with any of the at least one shared write buffer 52. Further, one shared write buffer 52 may be associated with one or more NAND zones 51. That is, a shared write buffer 52 may be shared by one or more NAND zones 51. Information indicating a correspondence between the NAND zone 51 and the shared write buffer 52 is stored in, for example, the DRAM 6.

A configuration and an operation of the host 2 are similar to those of the host 2A in the first comparative example and the host 2B in the second comparative example.

Hereinafter, an operation of the memory system 3 will be mainly described regarding differences from the memory system 3A of the first comparative example and the memory system 3B of the second comparative example.

The command reception module 121 of the memory system 3 fetches a write command from a location in the submission queue 401 indicated by an SQ Head pointer ((1) in FIG. 13). The write command is associated with user data to be written to any of at least one zone. More specifically, for example, a command ID, an LBA, a data length, data buffer information, and a namespace ID are designated in the write command.

The command reception module 121 sends the fetched write command to the write control module 123 ((2) in FIG. 13). Hereinafter, the fetched write command is also referred to as a first target write command.

The write control module 123 acquires the command ID, the LBA, the data length, and the data buffer information designated in the first target write command. The write control module 123 specifies a zone that includes the acquired LBA. The write control module 123 updates the write management table 26 using the acquired command ID, LBA, data length, and data buffer information and the specified zone ((3) in FIG. 13). Then, the write control module 123 determines whether user data of the write unit for a zone is stored in a data buffer 403 of the host 2 by using the write management table 26.

When user data of the write unit for a zone is stored in the data buffer 403, the write control module 123 transfers the user data of the write unit from the data buffer 403 to the NAND flash memory 5, and writes (programs) the transferred user data of the write unit into the NAND zone 51 (here, a NAND zone 511) in the NAND flash memory 5 ((4) in FIG. 13). Note that the user data of the write unit to be transferred may be once buffered in the DRAM 6. The user data of the write unit is, for example, data obtained by combining multiple pieces of user data to be written in accordance with multiple write commands. The write commands include the first target write command.

Then, when there is a write command for which corresponding user data becomes readable from the NAND flash memory 5, the write control module 123 notifies the command reception module 121 of completion of processing in accordance with the write command ((5) in FIG. 13). The write control module 123 notifies the command reception module 121 of completion of processing in accordance with each of the write commands that correspond to the user data of the write unit. Further, the write control module 123 deletes entries corresponding to the respective write commands from the write management table 26 ((6) in FIG. 13).

Whenever receiving a notification from the write control module 123, the command reception module 121 transmits a response indicating that processing in accordance with a corresponding write command is completed to the host 2. More specifically, in accordance with a notification from the write control module 123, the command reception module 121 writes a completion notification of the corresponding write command into a location in the completion queue 402 indicated by a CQ Tail pointer, and issues an interrupt ((7) in FIG. 13). The notification by the write control module 123 includes, for example, a command ID of a write command for which the processing has been completed. Operations performed by the command reception module 121 and the host 2 after issuing the interrupt are similar to the operations performed by the command reception module 121A and the host 2A of the first comparative example.

Note that, in a case where an error occurs in writing (programming) of user data, the write control module 123 and the command reception module 121 transmit, to the host 2, a response that indicates that the error has occurred in processing in accordance with a corresponding write command. That is, the command reception module 121 writes an error notification for the write command at a location in the completion queue 402 indicated by the CQ Tail pointer.

Further, when user data of the write unit for a zone is not stored in the data buffer 403 of the host 2, the write control module 123 does not write the user data to the NAND flash memory 5. Further, the write control module 123 instructs the forced response management module 122 to manage the first target write command ((8) in FIG. 13). This instruction includes, for example, the command ID and the namespace ID designated in the first target write command.

In accordance with the instruction from the write control module 123, the forced response management module 122 specifies an entry in the NS response management table 23 that corresponds to the namespace ID in the instruction. The forced response management module 122 acquires the forced response trigger time from the specified entry ((9) in FIG. 13). That is, the forced response management module 122 acquires the forced response trigger time for forcibly starting processing in accordance with the first target write command from the NS response management table 23.

Next, the forced response management module 122 adds an entry including the command ID in the instruction from the write control module 123 and the acquired forced response trigger time, to the command response management table 24 ((10) in FIG. 13). The forced response trigger time is used as an initial value of the remaining time until the processing in accordance with the first target write command is forcibly started (that is, the time until triggering).

The forced response management module 122 decreases the time until triggering included in each entry in the command response management table 24, for example, according to a lapse of time measured by the timer 16. Then, when the time until triggering becomes zero (that is, when the forced response trigger time has elapsed since reception of the corresponding write command), the forced response management module 122 instructs the write control module 123 to forcibly start the processing in accordance with the corresponding write command ((11) in FIG. 13). This instruction includes, for example, a command ID in an entry in which the time until triggering has become zero. Hereinafter, a write command indicated by the entry in which the time until triggering has become zero (that is, a write command for which the corresponding processing needs to be forcibly started) is referred to as a second target write command.

In accordance with the instruction by the forced response management module 122, the write control module 123 acquires an entry including the command ID in the instruction from the write management table 26 ((12) in FIG. 13). Hereinafter, the entry including the command ID in the instruction is referred to as a first entry. Further, it is assumed that a NAND zone 51 corresponding to a zone indicated by the first entry is a NAND zone 512. The write control module 123 transfers user data, which is to be written in accordance with the second target write command, from the data buffer 403 to the NAND flash memory 5 using the first entry ((13) in FIG. 13). Note that the user data to be buffered may be once buffered in the DRAM 6.

The write control module 123 writes the transferred user data with padding into the shared write buffer 52 (here, a shared write buffer 521) of the NAND flash memory 5 ((13) in FIG. 13). The write control module 123 specifies the user data to be written in accordance with the second target write command by using the LBA, the data length, and the data buffer information included in the first entry. The shared write buffer 521 into which the user data is written is associated with the NAND zone 51 (here, the NAND zone 512) in which the user data is originally to be written. Further, writing user data with padding means writing data of the write unit that includes the user data and data for padding.

The QLC method may be used for writing data to the shared write buffer 52. Alternatively, a single-level cell (SLC) method in which 1-bit data is stored per memory cell may be used for writing data to the shared write buffer 52.

Note that, in a case where the write management table 26 includes one or more entries including the same zone as the zone indicated by the first entry, the write control module 123 may transfer multiple pieces of user data, which are to be written in accordance with multiple write commands corresponding to the one or more entries, from the data buffer 403 to the NAND flash memory 5 using the first entry and the one or more entries, and write the transferred pieces of user data with padding into the shared write buffer 521 ((13) in FIG. 13).

Here, an operation performed by the write control module 123 in a case where the NAND zone 511 different from the NAND zone 512 is also associated with the shared write buffer 521 will be described. In this case, the write control module 123 further uses one or more entries in the write management table 26 each including a zone corresponding to the other NAND zone 511. The write control module 123 may specify one or more pieces of user data that are to be written, respectively, in accordance with one or more write commands corresponding to the one or more entries. Then, the write control module 123 may include the specified one or more pieces of user data in the above-described user data to be transferred from the data buffer 403 and written into the shared write buffer 521. At that time, the time until triggering that corresponds to each of the one or more write commands managed by the command response management table 24 may be considered. For example, only user data corresponding to a write command for which the time until triggering is less than a threshold may be included in the above-described user data to be transferred from the data buffer 403 and written to the shared write buffer 521.

For example, a description will be given regarding a case where the command reception module 121 fetches a write command for a zone corresponding to the NAND zone 511, which is different from the NAND zone 512, from the submission queue 401 before the forced response trigger time elapses since reception of the second target write command. Both of the two NAND zones 511 and 512 are associated with the shared write buffer 521. Hereinafter, the fetched write command for the zone corresponding to the NAND zone 511 is referred to as a third target write command. The third target write command is managed using the write management table 26 and the command response management table 24.

When the forced response trigger time has elapsed since the reception of the second target write command, the write control module 123 transfers user data to be written in accordance with the second target write command and user data to be written in accordance with the third target write command from the data buffer 403 to the NAND flash memory 5. Then, the write control module 123 writes data including the transferred user data into the shared write buffer 521. More specifically, in a case where the size of the transferred user data corresponds to the write unit, the write control module 123 writes the transferred user data into the shared write buffer 521. Further, in a case where the size of the transferred user data is less than the write unit, the write control module 123 writes the transferred user data with padding into the shared write buffer 521.

In this manner, when the NAND zone 51 (here, the NAND zone 512) corresponding to a zone targeted by the second target write command for which the forced response trigger time has elapsed and the other NAND zone 51 (here, the NAND zone 511) corresponding to a zone targeted by the third target write command are commonly associated with the shared write buffer 521, the user data corresponding to the third target write command can also be included in the above-described user data to be transferred from the data buffer 403 and written to the shared write buffer 521.

Next, when there is a write command for which corresponding user data becomes readable from the NAND flash memory 5, the write control module 123 notifies the command reception module 121 and the forced response management module 122 of completion of processing in accordance with the write command ((14) in FIG. 13), and the write control module 123 deletes an entry corresponding to each of one or more write commands from the write management table 26 ((15) in FIG. 13). The one or more write commands include the second target write command corresponding to the first entry.

Whenever receiving a notification from the write control module 123, the command reception module 121 transmits a response indicating that processing in accordance with a corresponding write command is completed to the host 2. More specifically, in accordance with the notification from the write control module 123, the command reception module 121 writes a completion notification of the corresponding write command into a location in the completion queue 402 indicated by a CQ Tail pointer, and issues an interrupt ((16) in FIG. 13). Subsequent operations performed by the command reception module 121 and the host 2 are similar to the operations performed by the command reception module 121A and the host 2A of the first comparative example.

Note that, in a case where an error occurs in writing (programming) of user data, the write control module 123 and the command reception module 121 transmit, to the host 2, a response which indicates that the error has occurred in processing in accordance with a corresponding write command. That is, the command reception module 121 writes an error notification for the write command at a location in the completion queue 402 indicated by the CQ Tail pointer.

Further, the forced response management module 122 deletes one or more entries that correspond to the one or more write commands, respectively, from the command response management table 24 in accordance with the notification from the write control module 123 ((17) in FIG. 13). The notification from the write control module 123 may include, for example, information indicating a command ID of each of the one or more write commands for which the processing has been completed and information indicating the NAND zone 51 (here, for example, the NAND zone 512). The NAND zone 512 included in the notification is a NAND zone 51 into which user data corresponding to the one or more write commands was to be originally written. The forced response management module 122 instructs the zone management module 124 to transition a state of a zone corresponding to the NAND zone 512 included in the notification from the opened state to the closed state ((18) in FIG. 13).

The zone management module 124 transitions the zone corresponding to the NAND zone 512 from the opened state to the closed state in accordance with the instruction from the forced response management module 122 ((19) in FIG. 13). For example, the zone management module 124 updates the zone descriptor 25 so as to indicate that the zone corresponding to the NAND zone 512 is in the closed state. Then, the zone management module 124 notifies the host 2 that the state of the zone corresponding to the NAND zone 512 has been changed ((20) in FIG. 13). Note that, in a case where user data for a zone corresponding to another NAND zone 51 (here, the NAND zone 511) is also written into the shared write buffer 521 that is commonly associated with the NAND zone 512, the write control module 123, the forced response management module 122, and the zone management module 124 operate to transition the zone corresponding to the NAND zone 511 from the opened state to the closed state in the same manner.

Note that, in a case where user data of the write unit for a zone is not stored in the data buffer 403 of the host 2 and there is no write command whose elapsed time since reception has reached the forced response trigger time (that is, the time until triggering has become zero), the command reception module 121, the write control module 123, and the forced response management module 122 may repeat an operation of fetching a write command from the submission queue 401 and updating the write management table 26 and the command response management table 24 on the basis of the fetched write command.

Through the above operation, in the memory system 3 of the embodiment, when the total amount of user data that is requested to be written in a zone by multiple write commands from the host 2 reaches the write unit, the controller 4 writes the user data of the write unit into the NAND zone 51 that corresponds to the zone. Then, the controller 4 transmits responses corresponding to the respective write commands to the host 2. As a result, the memory system 3 can efficiently use the storage area of the NAND flash memory 5.

Further, when there is a write command whose elapsed time since reception has reached the forced response trigger time, the controller 4 writes corresponding user data into the shared write buffer 52, instead of the NAND zone 51. Then, the controller 4 transmits a completion notification for the write command to the host 2.

In this manner, the controller 4 switches a write destination of user data between (1) a case where user data of the write unit to be written in a zone of the write destination of a write command has been stored in the data buffer 403 before elapsed time since reception of the write command reaches the forced response trigger time and (2) a case where there is a write command whose elapsed time since reception has reached the forced response trigger time. In the case (1), writing of the corresponding user data to the NAND zone 51 is started before the elapsed time since reception of the write command reaches the forced response trigger time, and thus, the controller 4 can respond to the write command within the time expected by the host 2. Further, in the case (2), the controller 4 can respond to the write command within the time expected by the host 2 by writing the corresponding user data to the shared write buffer 52.

Therefore, in the memory system 3, the storage area of the NAND flash memory 5 can be efficiently used while responding to the write command within the time expected by the host 2.

Note that the above-described operation in the memory system 3 can be applied not only to a case where data stored in the NAND flash memory 5 is managed on a zone basis, but also to a case where data stored in the NAND flash memory 5 is managed on an LBA basis. In this case, the operations by the zone management module 124 (for example, transition of a zone to the closed state and notification of change of a zone state to the host 2) are not performed.

In this case, the controller 4 manages at least one storage area in the NAND flash memory 5 and at least one shared write buffer 52. The at least one storage area is a storage area obtained by logically dividing the storage area of the NAND flash memory 5. The at least one storage area corresponds to at least one LBA.

Next, procedures of processes executed in the memory system 3 and the host 2 will be described with reference to flowcharts of FIGS. 14 to 20.

(Process for Setting Triggering of Forced Response in Memory System 3)

Figure 14:
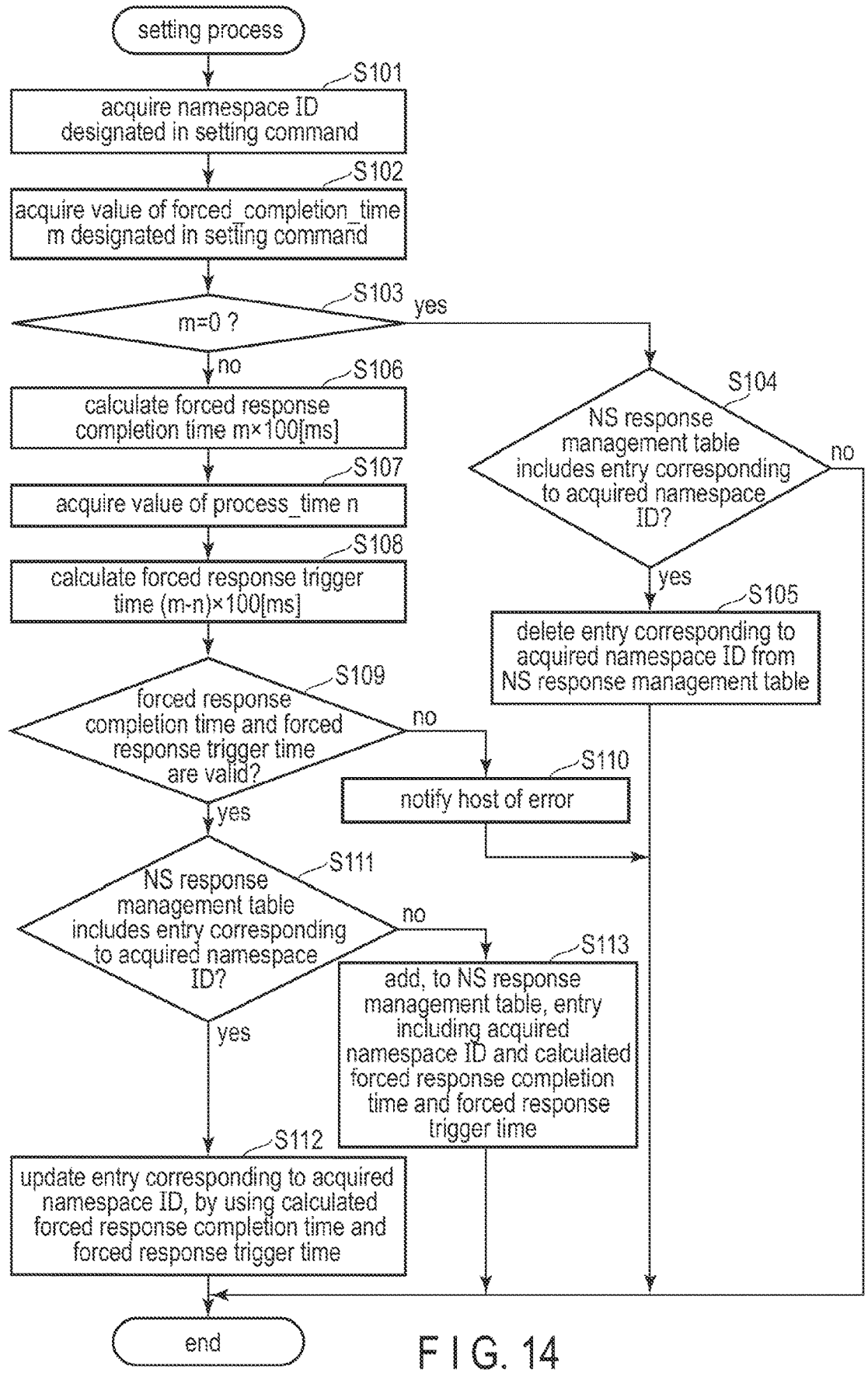
FIG. 14 is a flowchart illustrating an example of the procedure of a setting process executed in the memory system of the embodiment.

FIG. 14 is a flowchart illustrating an example of the procedure of a setting process executed by the CPU 12. The CPU 12 starts the setting process in accordance with reception of a setting command from the host 2. The setting process is a process for setting time between reception of a write command by the CPU 12 and forcible start of processing in accordance with the write command by the CPU 12.

First, the CPU 12 acquires a namespace ID designated in the setting command (step S101).

Further, the CPU 12 acquires a value of the forced_completion_time m designated in the setting command (step S102). For example, m is an integer of zero or more.

Next, the CPU 12 determines whether the acquired value of the forced_completion_time m is zero (step S103). When the value of forced_completion_time m is zero (YES in step S103), the CPU 12 determines whether the NS response management table 23 includes an entry corresponding to the acquired namespace ID (step S104). When the NS response management table 23 includes an entry corresponding to the acquired namespace ID (YES in step S104), the CPU 12 deletes the entry corresponding to the acquired namespace ID from the NS response management table 23 (step S105), and ends the setting process. As a result, the CPU 12 sets processing and responding of a write command for the namespace that is associated with the acquired namespace ID not to be forcibly triggered.

When the NS response management table 23 does not include an entry corresponding to the acquired namespace ID (NO in step S104), the CPU 12 ends the setting process. That is, the CPU 12 ends the setting process since processing and responding of a write command for the namespace associated with the acquired namespace ID have already been set so as not to be forcibly triggered.

When the value of the forced_completion_time m is not zero (NO in step S106), that is, is one or more, the CPU 12 calculates m×100 milliseconds as the forced response completion time (step S106). Then, the CPU 12 acquires a value of the process_time n (step S107). The CPU 12 calculates (m−n)×100 milliseconds as the forced response trigger time (step S108).

The CPU 12 determines whether the calculated forced response completion time and forced response trigger time are valid values (step S109). When at least one of the calculated forced response completion time and forced response trigger time is an invalid value (NO in step S109), the CPU 12 notifies the host 2 of an error (step S110), and ends the setting process. When the calculated forced response completion time and forced response trigger time are valid values (YES in step S109), the CPU 12 determines whether the NS response management table 23 includes an entry corresponding to the acquired namespace ID (step S111). When the NS response management table 23 includes an entry corresponding to the acquired namespace ID (YES in step S111), the CPU 12 updates the entry using the calculated forced response completion time and forced response trigger time (step S112), and ends the setting process. As a result, the CPU 12 can change the forced response completion time and the forced response trigger time that are associated with the designated namespace in accordance with the setting command.

On the other hand, when the NS response management table 23 does not include an entry corresponding to the acquired namespace ID (NO in step S111), the CPU 12 adds an entry including the acquired namespace ID and the calculated forced response completion time and forced response trigger time to the NS response management table 23 (step S113), and ends the setting process. As a result, the CPU 12 can set the forced response completion time and the forced response trigger time that are associated with the designated namespace in accordance with the setting command.

Through the above setting process, according to the setting command, the CPU 12 can set (or change) whether to trigger the forced response when a write command for the designated namespace is received. Further, according to the setting command, the CPU 12 can set the time between reception of a write command and forcible start of processing in accordance with the write command.

(Process for Confirming Triggering of Forced Response in Memory System 3)

Figure 15:
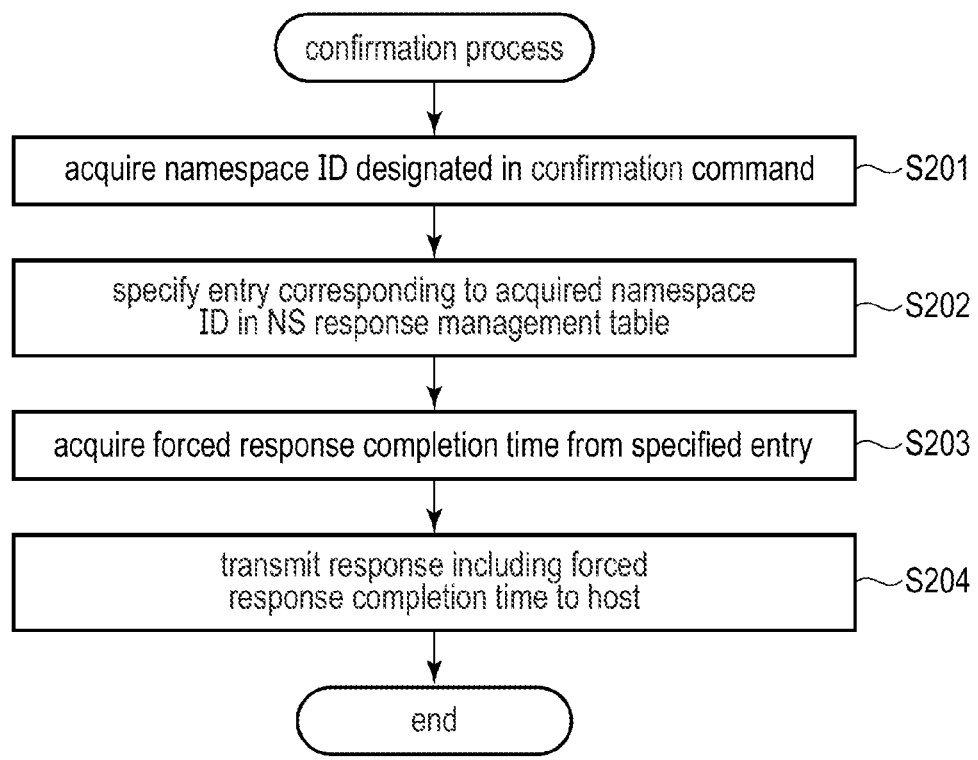
FIG. 15 is a flowchart illustrating an example of the procedure of a confirmation process executed in the memory system of the embodiment.

FIG. 15 is a flowchart illustrating an example of the procedure of a confirmation process executed by the CPU 12. The CPU 12 starts the confirmation process in accordance with reception of a confirmation command from the host 2. The confirmation process is a process for providing the host 2 with information on time for triggering the forced response set for a namespace.

First, the CPU 12 acquires a namespace ID designated in the confirmation command (step S201). The CPU 12 specifies an entry in the NS response management table 23 that corresponds to the acquired namespace ID (step S202). The CPU 12 acquires the forced response completion time from the specified entry (step S203). Then, the CPU 12 transmits the acquired forced response completion time to the host 2 (step S204). The CPU 12 may transmit information on the forced response completion time to the host 2. The information on the forced response completion time is, for example, a value obtained by converting the forced response completion time into units of 100 milliseconds, that is, a value of the forced_completion_time m (i.e., the forced response completion time/100).

Further, the CPU 12 may acquire the forced response trigger time from the specified entry and transmit the forced response trigger time to the host 2. Alternatively, the CPU 12 may transmit information on the forced response trigger time to the host 2. The information on the forced response trigger time is, for example, a value obtained by converting the forced response trigger time into units of 100 milliseconds, that is, a difference between the value of the forced_completion_time m and a value of the process_time n (i.e., m−n).

Through the above confirmation process, in accordance with the confirmation command, the CPU 12 can provide the host 2 with the information on at least one of the forced response completion time and the forced response trigger time set for the namespace.

(Process for Writing User Data to Memory System 3 in Host 2)

Figure 16:
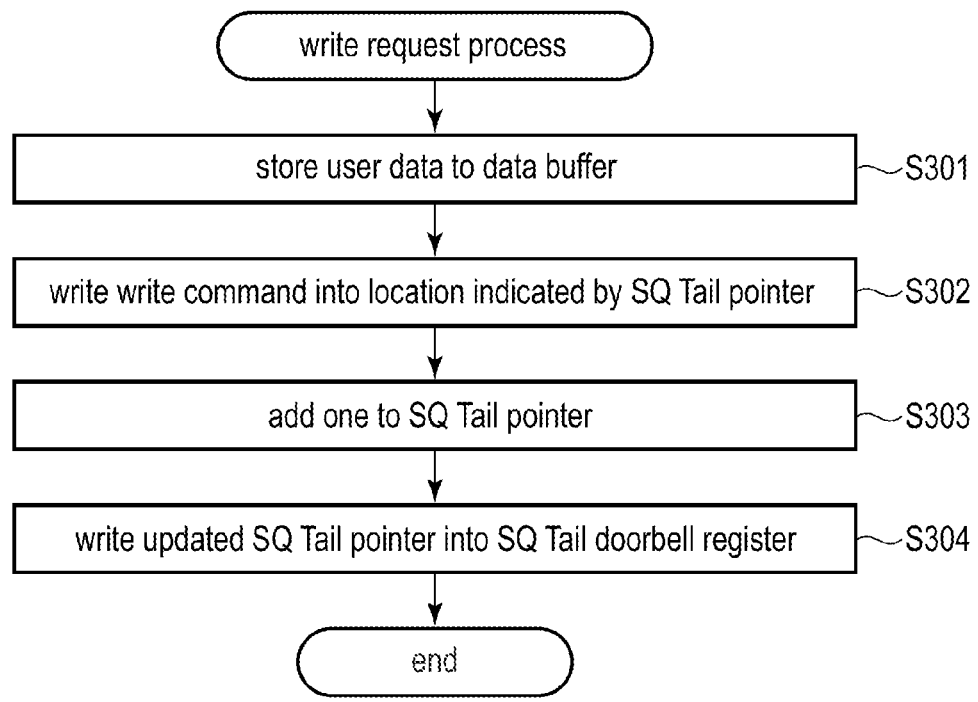
FIG. 16 is a flowchart illustrating an example of the procedure of a write request process executed by a host in the information processing system in FIG. 1.

FIG. 16 is a flowchart illustrating an example of the procedure of a write request process executed in the host 2. The write request process is a process in which the host 2 requests the memory system 3 to write user data. The write request process is executed by, for example, a processor provided in the host 2 executing a program.

The host 2 stores, in the data buffer 403, user data to be written into the NAND flash memory 5 of the memory system 3 (step S301). Then, the host 2 writes a write command into a location in the submission queue 401 indicated by an SQ Tail pointer (step S302). This write command is a write command requesting writing of the stored user data.

Next, the host 2 adds one to the SQ Tail pointer (step S303). When a value obtained by adding one to the SQ Tail pointer reaches the number of slots in the submission queue 401, the host 2 sets the SQ Tail pointer to zero. Then, the host 2 writes the updated SQ Tail pointer into the SQ Tail doorbell register of the memory system 3 (step S304).

Through the above write request process, the host 2 can request the memory system 3 to write the user data stored in the data buffer 403. The host 2 issues the write command to the memory system 3 via the submission queue 401, thereby requesting the memory system 3 to write the user data.

FIG. 17 is a flowchart illustrating an example of the procedure of a response reception process executed in the host 2. The response reception process is a process in which the host 2 receives a response to a write command from the memory system 3. The response reception process is executed by, for example, a processor provided in the host 2 executing a program. The host 2 starts execution of the response reception process in accordance with reception of an interrupt that is issued by the memory system 3.

First, the host 2 fetches a completion notification from a location in the completion queue 402 indicated by a CQ Head pointer (step S401). This completion notification is a response indicating that writing of corresponding user data to the NAND flash memory 5 has been completed in accordance with a write command issued by the host 2.

Next, the host 2 adds one to the CQ Head pointer (step S402). When a value obtained by adding one to the CQ Head pointer reaches the number of slots in the completion queue 402, the host 2 sets zero to the CQ Head pointer. The host 2 writes the updated CQ Head pointer into the CQ Head doorbell register of the memory system 3 (step S403). Then, the host 2 clears the interrupt received from the memory system 3 (step S404).

Next, the host 2 releases an area in the data buffer 403 in which the user data which has been written is stored, on the basis of the fetched completion notification (step S405).

Through the above response reception process, the host 2 can release the area in the data buffer 403 in which the user data is stored when the writing of the user data corresponding to the issued write command is completed.

Note that the host 2 can further receive from the memory system 3 in the response reception process a notification indicating that a zone has transitioned to the closed state. More specifically, when writing of user data corresponding to an issued write command is performed in accordance with triggering of the forced response, the host 2 may receive a notification indicating that a zone in which the user data was originally to be written has transitioned to the closed state. In accordance with this notification, the host 2 stops, for example, issuing a write command requesting writing of user data to the zone.

(Process for Writing User Data in Memory System 3)

Figure 18:
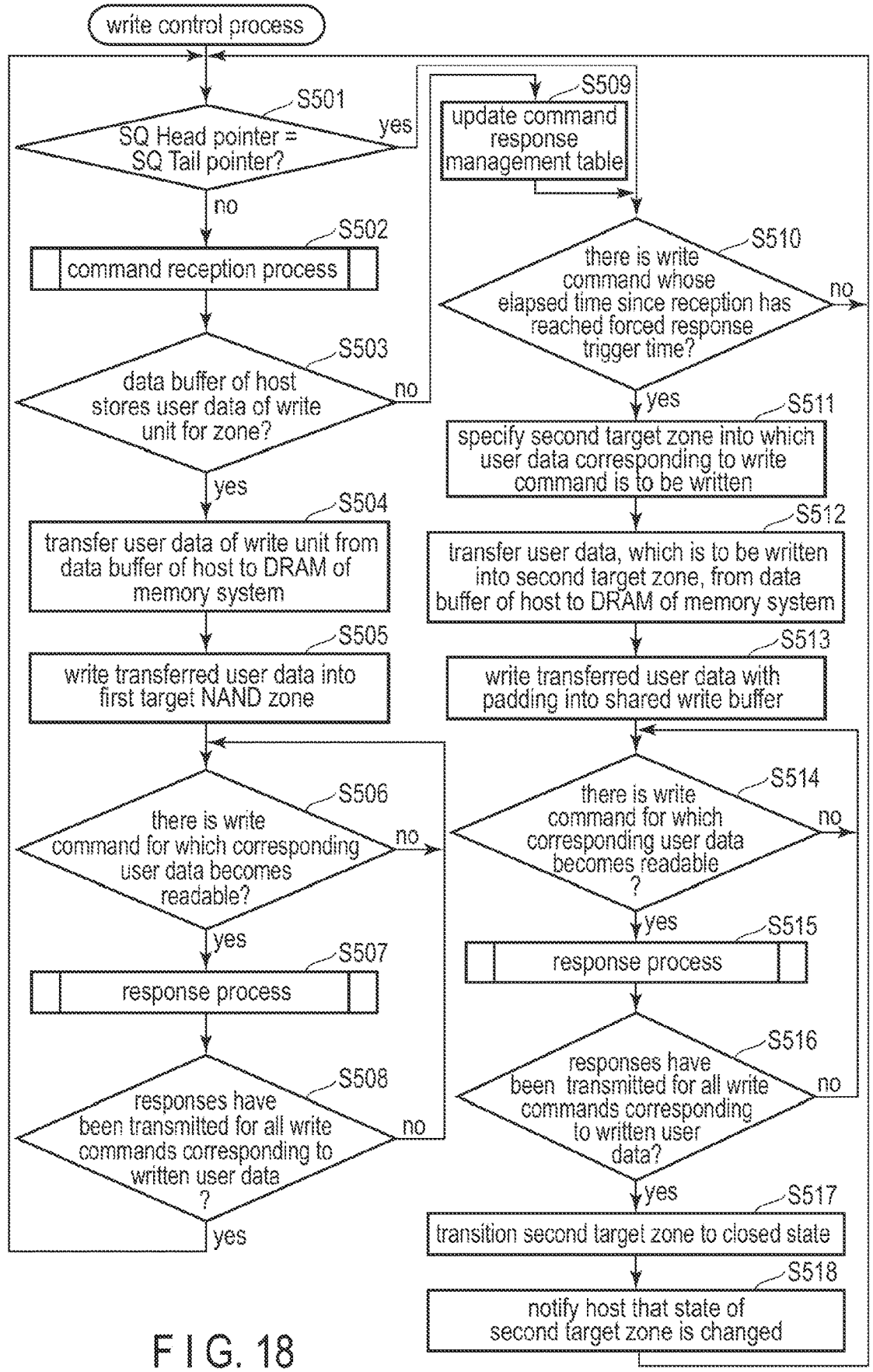
FIG. 18 is a flowchart illustrating an example of the procedure of a write control process executed in the memory system of the embodiment.

FIG. 18 is a flowchart illustrating an example of the procedure of a write control process executed by the CPU 12. The write control process is a process in which the CPU 12 receives a write command issued by the host 2 and controls writing of user data corresponding to write commands that have been received. Here, a case where the CPU 12 receives only write commands from the submission queue 401 of the host 2 will be described for easy understanding.

First, the CPU 12 determines whether an SQ Head pointer is equal to an SQ Tail pointer (step S501). That is, the CPU 12 determines whether there is a write command to be fetched in the submission queue 401 using the SQ Head pointer and the SQ Tail pointer.

When the SQ Head pointer is different from the SQ Tail pointer (NO in step S501), a write command to be fetched exists in the submission queue 401, and thus, the CPU 12 executes a command reception process (step S502). The command reception process is a process in which the CPU 12 receives a write command and acquires information for managing the received write command. More specifically, in the command reception process, the write management table 26 is updated in accordance with the received write command. The write management table 26 manages information on the received write command, for example, for each zone in which corresponding user data is to be written. A specific procedure of the command reception process will be described later with reference to a flowchart of FIG. 19.

Next, the CPU 12 determines whether user data of the write unit for a zone is stored in the data buffer 403 of the host 2 (step S503). When user data of the write unit for a zone is stored in the data buffer 403 (YES in step S503), the CPU 12 transfers the user data of the write unit from the data buffer 403 to the DRAM 6 of the memory system 3 (step S504). Hereinafter, the zone in which the user data of the write unit to be written is referred to as a first target zone. Further, a NAND zone 51 corresponding to the first target zone is also referred to as a first target NAND zone 51. The CPU 12 transfers the transferred user data to the NAND flash memory 5 and writes the user data in the first target NAND zone 51 (step S505). Note that the CPU 12 may transfer the user data of the write unit from the data buffer 403 to the NAND flash memory 5 without buffering the user data in the DRAM 6. That is, the CPU 12 may skip the step S504.

Next, the CPU 12 determines whether there is a write command for which corresponding user data becomes readable (step S506). When there is no write command for which corresponding user data becomes readable (NO in step S506), the processing by the CPU 12 returns to step S506. That is, since the CPU 12 has not notified the host 2 of completion of writing of user data in accordance with a write command yet, the processing by the CPU 12 returns to step S506.

When there is a write command for which corresponding user data becomes readable (YES in step S506), the CPU 12 executes a response process (step S507). The response process is a process for notifying the host 2 that writing of user data in accordance with a write command has been completed and updating information for managing the write command. A specific procedure of the response process will be described later with reference to a flowchart of FIG. 20.

Then, in step S508, the CPU 12 determines whether responses have been transmitted for all write commands corresponding to the user data of the write unit written in step S505. When no response has been transmitted for at least one of the write commands corresponding to the user data of the write unit (NO in step S508), the processing by the CPU 12 returns to step S506.

On the other hand, when the responses have been transmitted for all the write commands corresponding to the user data of the write unit (YES in step S508), the processing by the CPU 12 proceeds to step S501. That is, the CPU 12 continues a process for receiving a new write command from the host 2 and controlling writing of user data corresponding to write commands that have been received.

Further, when user data of the write unit for a zone is not stored in the data buffer 403 of the host 2 (NO in step S503), in step S509, the CPU 12 updates the command response management table 24 using the write command received in step S502, and the processing by the CPU 12 proceeds to step S510. Specifically, the CPU 12 acquires the forced response trigger time from the NS response management table 23 using a namespace ID designated in the write command received in step S502. Then, the CPU 12 adds an entry which includes the command ID designated in the write command and the acquired forced response trigger time, to the command response management table 24. The forced response trigger time in the added entry is used as an initial value of time until processing in accordance with the write command is forcibly started (that is, the time until triggering). The CPU 12 decreases the time until triggering included in each entry in the command response management table 24, for example, according to a lapse of time measured by the timer 16.

When the SQ Head pointer is equal to the SQ Tail pointer (YES in step S501), the processing by the CPU 12 proceeds to step S510.

Next, the CPU 12 determines whether there is a write command whose elapsed time since reception has reached the forced response trigger time (step S510). Specifically, for example, when the command response management table 24 includes an entry indicating a write command in which the time until triggering becomes zero, the CPU 12 determines that there is a write command whose elapsed time since reception has reached the forced response trigger time.

When there is no write command whose elapsed time since reception has reached the forced response trigger time (NO in step S510), the processing by the CPU 12 proceeds to step S501.

When there is a write command whose elapsed time since reception has reached the forced response trigger time (YES in step S510), the CPU 12 specifies a zone into which user data corresponding to the write command is to be written (hereinafter, referred to as a second target zone) (step S511). The CPU 12 specifies the second target zone using, for example, the write management table 26. Then, the CPU 12 transfers the user data to be written into the second target zone from the data buffer 403 of the host 2 to the DRAM 6 of the memory system 3 (step S512). More specifically, the CPU 12 specifies at least one piece of user data to be written into the second target zone, for example, using the write management table 26. The at least one piece of user data corresponds to at least one write command, respectively. The CPU 12 transfers the at least one specified piece of user data from the data buffer 403 to the DRAM 6. The size of the transferred user data is smaller than the write unit to the NAND flash memory 5.

Next, the CPU 12 writes the transferred user data with padding into the shared write buffer 52 (step S513). That is, the CPU 12 adds padding data to the user data, thereby writing the data of the write unit to the shared write buffer 52. The shared write buffer 52 into which the user data is written is associated with the NAND zone 51 corresponding to the second target zone. Note that the CPU 12 may transfer the user data from the data buffer 403 to the NAND flash memory 5 without buffering the user data in the DRAM 6. That is, the CPU 12 may skip the step S512.

Next, the CPU 12 determines whether there is a write command for which corresponding user data becomes readable (step S514). When there is no write command for which corresponding user data becomes readable (NO in step S514), the processing by the CPU 12 returns to step S514.

When there is a write command for which corresponding user data becomes readable (YES in step S514), the CPU 12 executes the response process (step S515). That is, the CPU 12 notifies the host 2 that the writing of the user data in accordance with the write command has been completed, and updates information for managing the write command.

Then, in step S516, the CPU 12 determines whether responses have been transmitted for all write commands corresponding to the written user data in step S513. When no response has been transmitted for at least one of the write commands corresponding to the written user data (NO in step S516), the processing by the CPU 12 returns to step S514.

On the other hand, when the responses have been transmitted for all the write commands corresponding to the written user data (YES in step S516), the CPU 12 transitions the second target zone to the closed state (step S517). Then, the CPU 12 notifies the host 2 of the change of the state of the second target zone (step S518), and the processing by the CPU 12 proceeds to step S501.

Note that the CPU 12 may transition the second target zone to the full state, instead of transitioning to the closed state. For example, in step S513, the CPU 12 writes the transferred user data and padding data into the shared write buffer 52 so that the second target zone becomes in a state where data has been written in the whole of the second target zone (i.e., full state). In this case, after responding to all the write commands corresponding to the written user data, the CPU 12 notifies the host 2 that, for example, the second target zone is in the full state. Then, the processing by the CPU 12 proceeds to step S501.

Through the above write control process, the CPU 12 can receive a write command from the host 2 and control writing of user data corresponding to write commands that have been received.

Specifically, when user data of the write unit to be written into the first target zone is stored in the data buffer 403, the CPU 12 writes the user data of the write unit to the first target NAND zone 51. Then, the CPU 12 transmits, to the host 2, a completion notification for the write command corresponding to the user data that has been written.

Further, when there is a write command whose elapsed time since reception has reached the forced response trigger time, the CPU 12 specifies the second target zone into which the corresponding user data is to be written. The CPU 12 writes the user data, which is to be written into the second target zone and is stored in the data buffer 403, not into the NAND zone 51 but into the shared write buffer 52. Then, the CPU 12 transmits, to the host 2, a completion notification for the write command corresponding to the user data that has been written.

As a result, the memory system 3 can efficiently use the storage area of the NAND flash memory 5 while responding to a write command within the time expected by the host 2.

Figure 19:
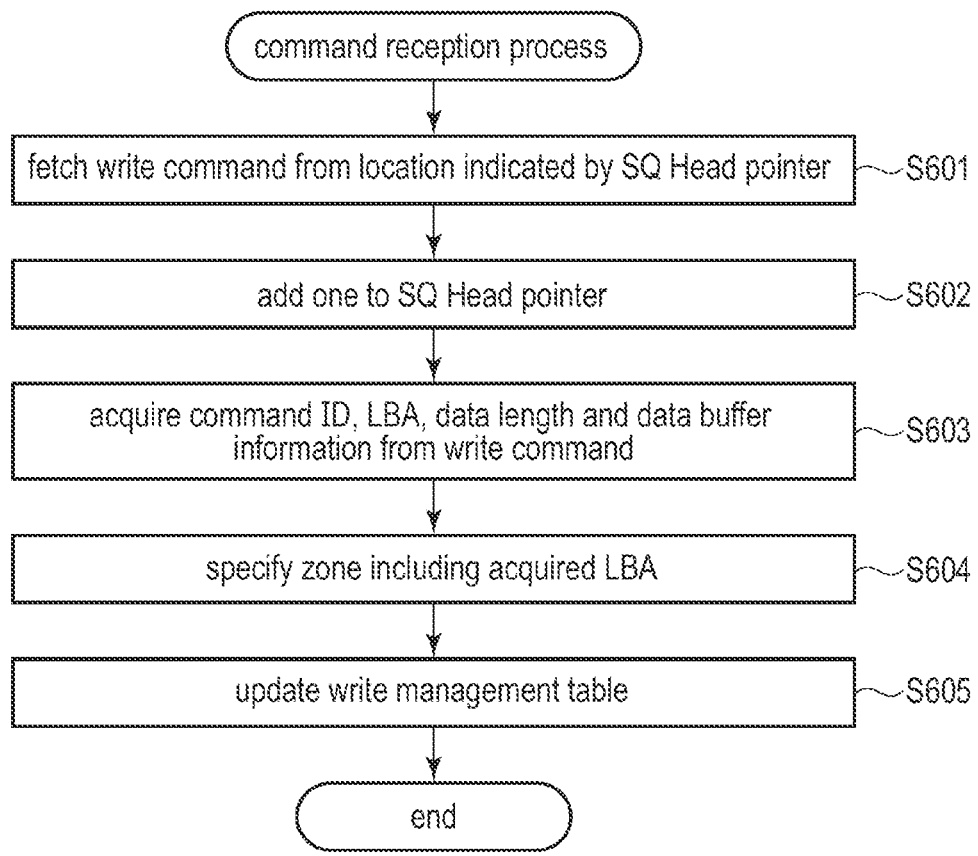
FIG. 19 is a flowchart illustrating an example of the procedure of a command reception process executed in the memory system of the embodiment.

FIG. 19 is a flowchart illustrating an example of the procedure of the command reception process executed by the CPU 12. The command reception process is a process for receiving a write command and acquiring information for managing the received write command. The command reception process corresponds to step S502 of the write control process described above with reference to FIG. 18.

First, the CPU 12 fetches a write command from a location in the submission queue 401 indicated by an SQ Head pointer (step S601). The CPU 12 adds one to the SQ Head pointer (step S602). When the value obtained by adding one to the SQ Head pointer reaches the number of slots in the submission queue 401, the CPU 12 sets the SQ Head pointer to zero.

Next, the CPU 12 acquires a command ID, an LBA, a data length, and data buffer information from the fetched write command (step S603). The CPU 12 specifies a zone that includes the acquired LBA (step S604). That is, the CPU 12 specifies a zone to which an LBA range including the acquired LBA has been allocated.

Then, the CPU 12 updates the write management table 26 (step S605), and ends the command reception process. Specifically, the CPU 12 adds, to the write management table 26, an entry indicating the acquired command ID, LBA, data length, and data buffer information, and the specified zone.

Through the above command reception process, the CPU 12 can receive a write command from the host 2 and acquire information for managing the received write command. The CPU 12 updates the write management table 26 using the acquired information for managing the write command. The CPU 12 can manage user data to be written into the NAND flash memory 5 in accordance with each write command by using the write management table 26.

FIG. 20 is a flowchart illustrating an example of the procedure of the response process executed by the CPU 12. The response process is a process for notifying the host 2 that writing of user data in accordance with a write command has been completed and updating information for managing the write command. The response process corresponds to each of steps S507 and S515 of the write control process described above with reference to FIG. 18.

First, the CPU 12 writes a completion notification of a target write command into a location in the completion queue 402 that is indicated by a CQ Tail pointer (step S701). The target write command is a write command for which writing of the corresponding user data to the NAND flash memory 5 has been completed.

Next, the CPU 12 adds one to the CQ Tail pointer (step S702). When the value obtained by adding one to the CQ Tail pointer reaches the number of slots in the completion queue 402, the CPU 12 sets the CQ Tail pointer to zero. Then, the CPU 12 issues an interrupt to the host 2 (step S703). The CPU 12 issues the interrupt to notify the host 2 that there is a new completion notification to be processed in the completion queue 402.

The CPU 12 updates the write management table 26 (step S704). Specifically, the CPU 12 deletes an entry corresponding to the target write command from the write management table 26. Then, the CPU 12 updates the command response management table 24 (step S705), and ends the response process. Specifically, the CPU 12 deletes an entry corresponding to the target write command from the command response management table 24. When there is no entry corresponding to the target write command in the command response management table 24, the CPU 12 skips the procedure of step S705 and ends the response process. For example, when the CPU 12 determines that user data of the write unit for a zone is stored in the data buffer 403 in accordance with reception of the target write command, an entry corresponding to the target write command is not added to the command response management table 24. In this case, the CPU 12 skips the procedure of step S705.

Through the above response process, the CPU 12 can notify the host 2 that writing of user data in accordance with a write command has been completed, and update information for managing the write command.

As described above, according to the embodiment, the memory system 3 can respond to a write request within time expected by the host 2. The controller 4 receives, from the host 2, a first write request associated with first data having a size less than a first data unit which is a write unit to the NAND flash memory 5. In response to a lapse of first time since the reception of the first write request, the controller 4 starts a write process of second data including at least the first data to the NAND flash memory 5. The controller 4 transmits a first response to the first write request to the host 2 in response to completion of the write process. The first time is time obtained by subtracting second time from third time. The third time is designated by the host 2 as a time limit of the transmission of the first response since the reception of the first write request.

In this manner, the controller 4 forcibly starts the write process of the second data, which includes at least the first data associated with the first write request, to the NAND flash memory 5 when the first time has elapsed since the reception of the first write request, and thus, can respond to the first write request within the time expected by the host 2.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller configured to:
    manage a first time length by subtracting a second time length from a third time length, the third time length being designated by a host as a time limit of transmission of a first response since reception of a first write request, the second time length corresponding to a time length when data becomes readable from the nonvolatile memory after a write process of the data to the nonvolatile memory is started;
    in response to fetching the first write request associated with first data from the host, the first data having a size less than a first data unit that is a write unit to the nonvolatile memory, start to measure a time period;
    in response to the measured time period reaching the first time length, start a write process of second data to the nonvolatile memory, the second data including at least the first data, the second data having a size of the first data unit; and
    in response to completion of the write process of the second data, transmit the first response for the first write request to the host.

2. The memory system according to claim 1, wherein the second data includes the first data and padding data.

3. The memory system according to claim 1, wherein the controller is configured to
    in starting the write process of the second data, fetch the first data from the host.

4. The memory system according to claim 1, wherein the controller is further configured to:
    in response to fetching a second write request associated with third data from the host after starting to measure the time period and before the measured time period reaches the first time length, start a write process of fourth data to the nonvolatile memory, wherein
the fourth data includes the first data and the third data, and
the fourth data has a size of the first data unit.

5. The memory system according to claim 4, wherein the controller is further configured to:
in response to completion of the write process of the fourth data, transmit the first response for the first write request to the host; and
in response to the completion of the write process of the fourth data, transmit a second response for the second write request to the host.

6. The memory system according to claim 4, wherein the controller is further configured to:
manage a plurality of zones obtained by logically dividing a logical address space that is provided by the memory system to the host, the plurality of zones including at least a first zone; and
start the write process of the fourth data in a case where both the first write request and the second write request designate the first zone.

7. The memory system according to claim 6, wherein the controller is further configured to:
manage at least one first storage area that is a partial storage area obtained by logically dividing a storage area of the nonvolatile memory and corresponds to at least one of the plurality of zones; and
write the fourth data into the first storage area corresponding to the first zone.

8. The memory system according to claim 6, wherein the plurality of zones further includes a second zone, and the controller is further configured to:
manage a plurality of second storage areas that are partial storage areas obtained by logically dividing a storage area of the nonvolatile memory and have a one-to-one correspondence with the plurality of zones; and
in response to fetching a third write request designating the second zone from the host, write fifth data into a third storage area, the third storage area being one of the plurality of second storage areas and corresponding to the second zone that is different from the first zone, the third write request being associated with the fifth data, the fifth data having a size of the first data unit.

9. The memory system according to claim 6, wherein the controller is further configured to
transition a state of the first zone from a first state where data is writable to a second state where data writing is interrupted.

10. The memory system according to claim 6, wherein the controller is further configured to:
manage at least one namespace that is obtained by logically dividing the logical address space provided by the memory system to the host, the at least one namespace including the plurality of zones; and
manage the third time length designated for the at least one namespace by the host, in common for the respective zones included in the at least one namespace.

11. A method of controlling a nonvolatile memory, comprising:
managing a first time length by subtracting a second time length from a third time length, the third time length being designated by a host as a time limit of transmission of a first response since reception of a first write request, the second time length corresponding to a time length when data becomes readable from the nonvolatile memory after a write process of the data to the nonvolatile memory is started;
fetching the first write request associated with first data from the host, the first data having a size less than a first data unit that is a write unit to the nonvolatile memory;
in response to fetching the first write request from the host, starting to measure a time period;
determining that the measured time period reaches the first time length;
in response to determining that the measured time period reaches the first time length, starting a write process of second data to the nonvolatile memory, the second data including at least the first data, the second data having a size of the first data unit;
determining that the write process of the second data is completed; and
in response to the completion of the write process of the second data, transmitting the first response for the first write request to the host.

12. The method according to claim 11, wherein the second data includes the first data and padding data.

13. The method according to claim 12, further comprising:
in starting the write process of the second data, fetching the first data from the host.

14. The method according to claim 11, further comprising:
fetching a second write request associated with third data from the host after starting to measure the time period and before the measured time period reaches the first time length; and
in response to fetching the second write request from the host, starting a write process of fourth data to the nonvolatile memory, wherein
the fourth data includes the first data and the third data, and
the fourth data has a size of the first data unit.

15. The method according to claim 14, further comprising:
determining that the write process of the fourth data is completed;
in response to the completion of the write process of the fourth data, transmitting the first response for the first write request to the host; and
in response to the completion of the write process of the fourth data, transmitting a second response for the second write request to the host.

16. The method according to claim 14, further comprising:
managing a plurality of zones obtained by logically dividing a logical address space that is provided to the host, the plurality of zones including at least a first zone;
determining that both the first write request and the second write request designate the first zone; and
in response to determining that both the first write request and the second write request designate the first zone, starting the write process of the fourth data.

17. The method according to claim 16, further comprising:
managing at least one first storage area that is a partial storage area obtained by logically dividing a storage area of the nonvolatile memory and corresponds to at least one of the plurality of zones; and
writing the fourth data into the first storage area corresponding to the first zone.

18. The method according to claim 16, wherein
the plurality of zones further includes a second zone, and
the method further comprises:
- managing a plurality of second storage areas that are partial storage areas obtained by logically dividing a storage area of the nonvolatile memory and have a one-to-one correspondence with the plurality of zones;
- fetching a third write request designating the second zone from the host; and
- in response to fetching the third write request from the host, writing fifth data into a third storage area, the third storage area being one of the plurality of second storage areas and corresponding to the second zone that is different from the first zone, the third write request being associated with the fifth data, the fifth data having a size of the first data unit.

19. The method according to claim 16, further comprising:
- transitioning a state of the first zone from a first state where data is writable to a second state where data writing is interrupted.

20. The method according to claim 16, further comprising:
- managing at least one namespace that is obtained by logically dividing the logical address space provided to the host, the at least one namespace including the plurality of zones; and
- managing the third time length designated for the at least one namespace by the host, in common for the respective zones included in the at least one namespace.

* * * * *